Jan. 2, 1968   A. J. RADCLIFFE, JR., ETAL   3,361,898
MULTIPLYING SYSTEM
Filed April 16, 1965   15 Sheets-Sheet 1

Fig.1.

INVENTORS.
ARTHUR J. RADCLIFFE JR.
JAMES A. MITCHELL
JOHN O. GRIGGS JR.
IAN R. CLINTON.

BY Gerald P. Hibnick

ATTORNEY.

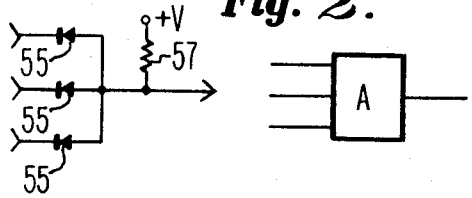
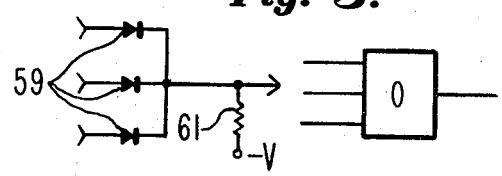
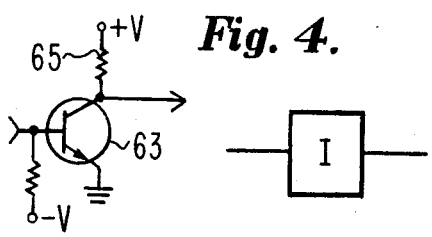
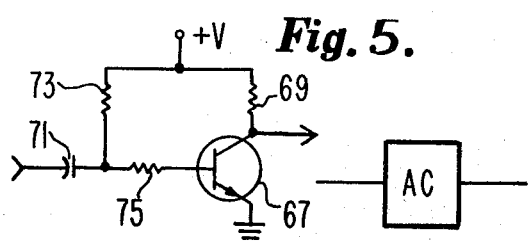
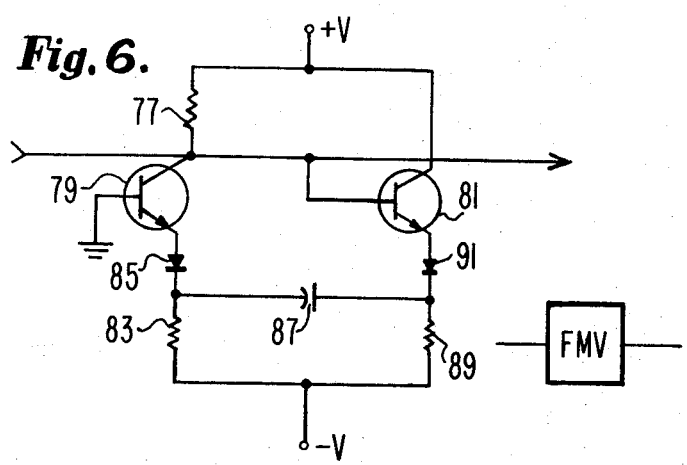
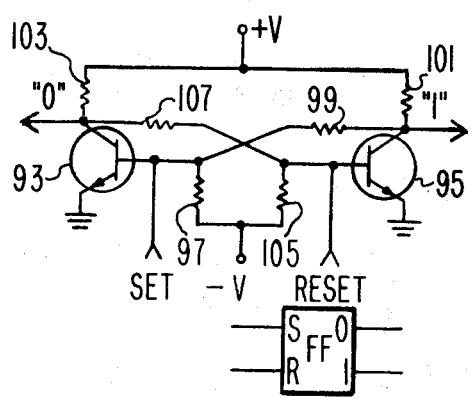
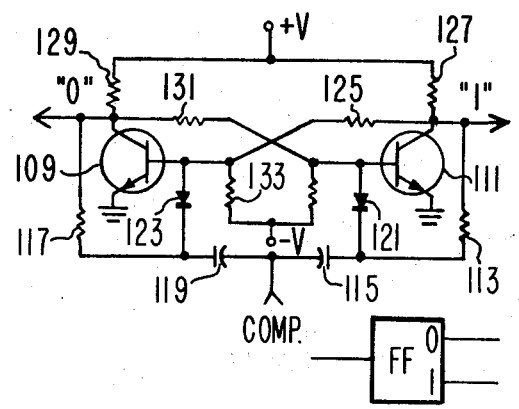

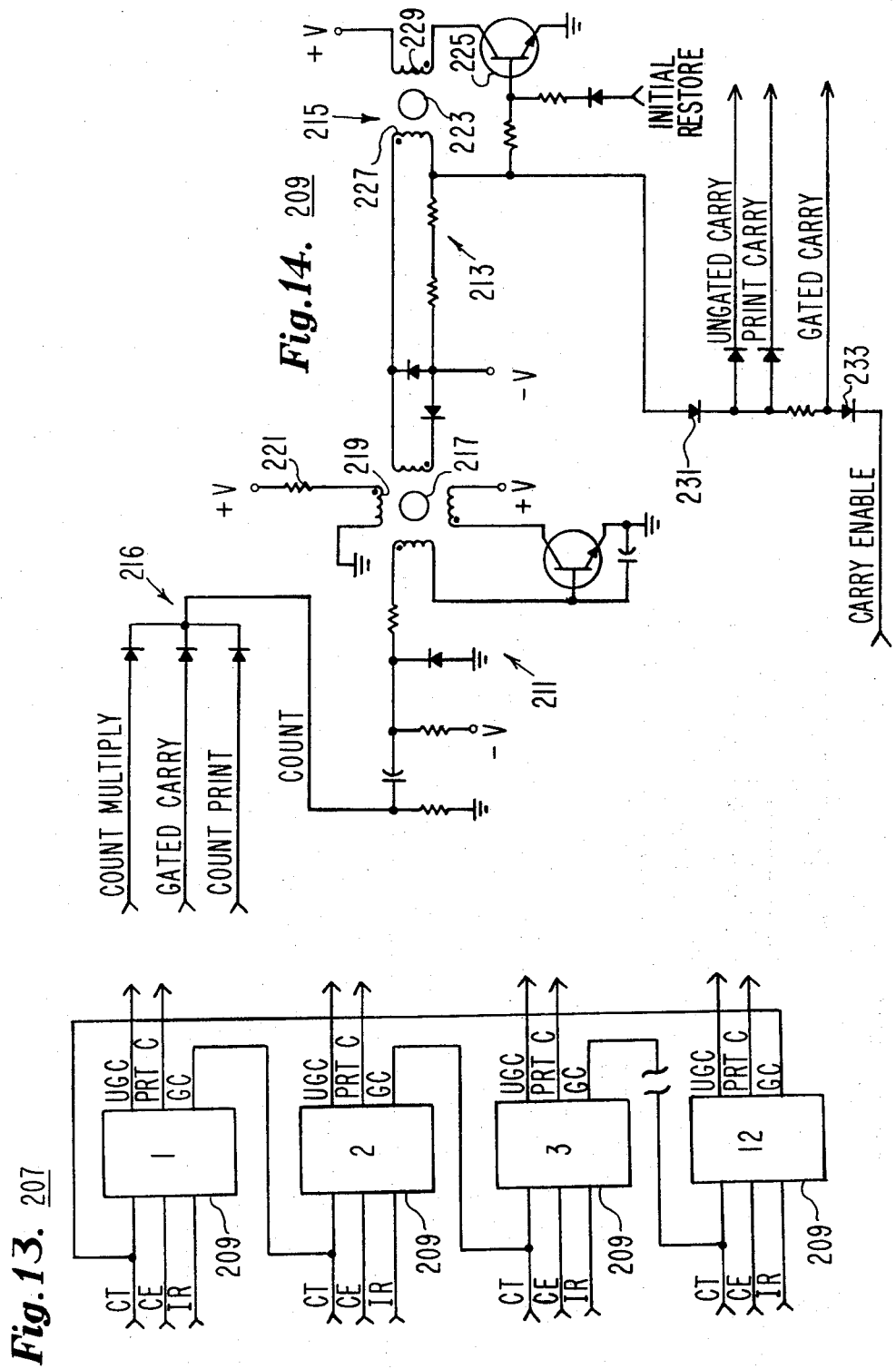

Figures 15, 16, 17:
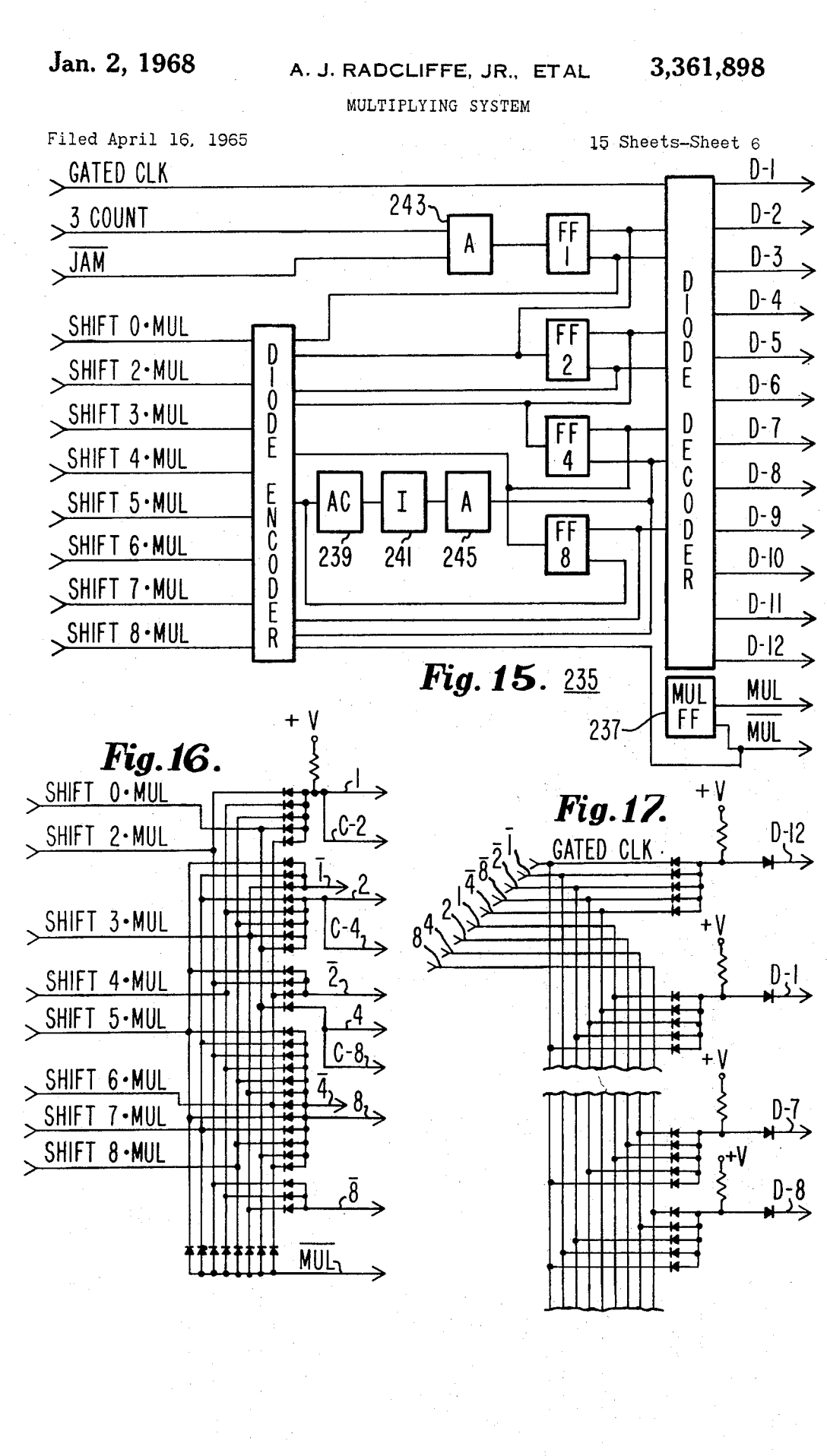

Jan. 2, 1968   A. J. RADCLIFFE, JR., ET AL   3,361,898
MULTIPLYING SYSTEM
Filed April 16, 1965   15 Sheets-Sheet 6

| | Digit | 5 | 4 | 3 | 2 | 1 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|
| | Accumulator Stage | 5 | 4 | 3 | 2 | 1 | 12 | 11 | 10 | 9 | 8 | 7 | 6 | 5 | 4 | 3 | 2 | 1 |
| | Printer Column | | | | | | | | 10 | 9 | 8 | 7 | 6 | 5 | 4 | 3 | 2 | 1 |
| Multiplicand | | | | | | | $ | 0 | 0 | 0 | 0 | 0 | 0 | 9 | 4 | . | 7 | 6 | 2 |
| Multiplier | | | | | | | | 0 | 0 | 0 | 0 | 0 | 0 | 0 | 3 | . | 1 | 2 |
| 1st Partial Product | | | | | | | | | | | | | | 1 | 8 | 9 | 5 | 2 |
| 2nd Partial Product | | | | | | | | | | | | | 0 | 9 | 4 | 7 | 6 | |
| 3rd Partial Product | | | | | | | | | | | | 0 | 0 | 0 | 0 | 0 | | |
| 4th Partial Product | | | | | | | | | | | 0 | 0 | 0 | 0 | 0 | | | |
| 5th Partial Product | | | | | | | | | | 0 | 0 | 0 | 0 | 0 | | | | |
| 6th Partial Product | | | | | | | | | 0 | 0 | 0 | 0 | 0 | | | | | |
| 7th Partial Product | | | | | | | | 0 | 0 | 0 | 0 | 0 | | | | | | |
| 8th Partial Product | | | | | | | 0 | 0 | 0 | 0 | 0 | | | | | | | |
| 9th Partial Product | | | | | | 0 | 0 | 0 | 0 | 0 | | | | | | | | |
| 10th Partial Product | | | | | 0 | 0 | 0 | 0 | 0 | | | | | | | | | |
| Sum of Partial Products | | | | | | 0 | 0 | 0 | 0 | 0 | 0 | 0 | 2 | 9 | 5 | 6 | 5 | 1 | 2 |
| Final Product | | | | | | | | $ | 0 | 0 | 0 | 0 | 0 | 2 | 9 | 5 | . | 6 | 5 |

Fig. 26.

| AAR = | 0 | 11 | 10 | 9 | 8 | 7 | 6 | 5 | 4 | 3 | 2 | 1 | | | | | |
|---|---|---|---|---|---|---|---|---|---|---|---|---|---|---|---|---|---|
| PRODUCT ACCUMULATOR COLUMN | 12 | 11 | 10 | 9 | 8 | 7 | 6 | 5 | 4 | 3 | 2 | 1 | | | | | |
| MULTIPLICAND X 1st MULTIPLIER | 2 | 1 | | | | | | | | | | | | | | | |
| MULTIPLICAND X 2nd MULTIPLIER | 1 | REALIGN | | | | | | | | | | | | | | | |
| MULTIPLICAND X 3rd MULTIPLIER | | | 10 | 9 | 8 | 7 | 6 | 5 | 4 | 3 | 2 | 1 | | | | | |
| MULTIPLICAND X 4th MULTIPLIER | | 10 | 9 | 8 | 7 | 6 | 5 | 4 | 3 | 2 | 1 | | | | | | |
| MULTIPLICAND X 5th MULTIPLIER | ⑩ | 9 | 8 | 7 | 6 | 5 | 4 | 3 | 2 | 1 | | | | | | | |
| MULTIPLICAND X 6th MULTIPLIER * | ⑨ | 8 | 7 | 6 | 5 | 4 | 3 | 2 | 1 | | | | | | 10 | | |
| MULTIPLICAND X 7th MULTIPLIER * | ⑧ | 7 | 6 | 5 | 4 | 3 | 2 | 1 | | | | | | 10 | 9 | | |
| MULTIPLICAND X 8th MULTIPLIER * | ⑦ | 6 | 5 | 4 | 3 | 2 | 1 | | REALIGN | | | | 10 | 9 | 8 | | |
| MULTIPLICAND X 9th MULTIPLIER * | ⑥ | 5 | 4 | 3 | 2 | 1 | | | | | | 10 | 9 | 8 | 7 | | |
| MULTIPLICAND X 10th MULTIPLIER * | ⑤ | 4 | 3 | 2 | 1 | | | | | | 10 | 9 | 8 | 7 | 6 | | |

◯ INDICATES WHEN EXCEED CAPACITY CAN OCCUR

✳ INDICATES WHEN EC FF SETS

Jan. 2, 1968   A. J. RADCLIFFE, JR., ET AL   3,361,898
MULTIPLYING SYSTEM
Filed April 16, 1965   15 Sheets-Sheet 15

3,361,898
MULTIPLYING SYSTEM
Arthur J. Radcliffe, Jr., James A. Mitchell, and John O.
 Griggs, Jr., Plymouth, and Ian R. Clinton, Livonia,
 Mich., assignors to Burroughs Corporation, Detroit,
 Mich., a corporation of Michigan
Filed Apr. 16, 1965, Ser. No. 448,711
12 Claims. (Cl. 235—160)

ABSTRACT OF THE DISCLOSURE

A multiplying system which combines an electromechanical accounting machine and an electronic multiplying adjunct. The system accumulates all of the partial product digits associated with each particular multiplier digit, totals them, transfers tens carries, and then sequentially discards a preselected number of the least significant digits of the true product to provide an especially high degree of product accuracy. The system also provides for clearing from the accumulator stage the least significant product digits, detecting exceed capacity conditions and transferring the final product to the accounting machine.

---

This invention relates to multiplying systems, and more particularly to a multiplying adjunct adapted for association with a conventional style accounting machine so as to supplement the functions normally performed by such machine with a multiplying function.

Certain conditions unique to multiplication systems, in contrast to those capable of only adding and subtracting, may control their design, especially those systems handling multidigit values and employing a conventional accounting machine for input and output purposes. For example, on a conventional decimal style accounting machine, if you were to add a ten digit number to another ten digit number, the first ten digit number or factor would be indexed into the machine and stored in an accumulator mechanism having ten or more columnar digit positions. Next, the second ten digit factor would be indexed and then entered in an additive manner into the accumulator mechanism such that a subsequent interrogation of the accumulator would provide the sum of the two factors. If the adding process generated a tens carry into the most significant digit position, there would result a total having eleven columnar digit positions. Accordingly, the accumulator, and the means for permanently recording the total, such as a printer, would each have to contain a minimum of eleven columnar digit processing positions. However, if the two ten digit factors were respectively the multiplicand and the multiplier in a multiplication problem and could be indexed into the accounting machine in a manner similar to that employed in the addition problem, each digit of the multiplier would have to be associated with each digit of the multiplier and thereby form ten discrete partial products each containing ten digits. Also, the partial product digits attributable to each particular digit of the multiplier would have to be justified or columnarized and added together to form nineteen distinct sums in decimal order. Additionally there would have to be provision for handling tens carries, such that a twenty digit product could be accumulated, stored, and reproduced. To accomplish these tasks, there would have to be provided specialized multiplier, multiplicand, and product accumulator digit addressing means, as well as decimal counters and a product accumulator.

In a logically simple system, the product accumulator would be of sufficient size to hold all twenty digits of the final product. Means would be provided to sequentially steer the one hundred partial product digits into the proper twenty positions of the accumulator and then total them to form the final product. Means also would be provided to transfer the final product to a twenty column printer. Thus, the logically simple multiplying system would require means for indexing two ten column factors and means for accumulating and printing a twenty column product; whereas, the same two factors when added would require only an eleven column accumulator and printer.

Those familiar with the production of accounting machines appreciate that nearly doubling the size of the accumulator and printer greatly increases the cost and size of the accounting machine as well as introduces other problems. To obviate these obstacles, numerous methods have been devised to reduce the columnar size of the product accumulator and printer without considerably decreasing the accuracy of the resultant product. Some methods involve discarding or rounding off the least significant digits of the input factors. Such methods provide a relatively low degree of accuracy. Other methods discard or round off partial products and provide moderate accuracy. The present system accumulates all the partial product digits associated with each particular multiplier digit, totals them, transfers tens carries, and then sequentially discards a preselected number of the least significant digits of the true product to thereby provide an especially high degree of accuracy.

A multiplying system employing product accumulators and printers which have less columnar positions than the sum of the digit positions of the multiplier and multiplicand must provide means for preventing an exceeding of the columnar capacity of the accumulator and printer and also for aligning or justifying their columnar digit positions. The present inventive system meets these needs by electromechanically maintaining a fixed alignment between each of the several digit storing stages in the product accumulator and the several digit positions in the printer. During the formation of the product, the stages in the accumulator are coupled in a ring configuration and are sequentially addressable commencing from a variably preprogrammed initial stage. The preprogramming is formulated such that the last stage to be addressed for storing a non-zero partial product digit corresponds to the most significant digit position in the product as well as the most significant digit position utilized in the product accumulator and the printer. Exceed capacity circuitry is provided which prevents the least significant accumulator stage from being addressed for storing a non-zero partial product digit or from receiving a carry from the most significant accumulator stage once the least significant stage has stored the sum of the partial product digits which form the least significant digit to be printed.

Accordingly, it is a primary object of this invention to provide an improved accounting system having multiplying capabilities performed by an adjunct controlled from an accounting machine from which and to which are sent respectively the multiplication factors and the accumulated product.

Another object of this invention is to provide an improved multiplying system which generates all partial product digits of multiplication, sequentially justifies and totals the partial products, and then sequentially discards a preselected number of the least significant digits of the accumulated product as they are formed.

Another object of this invention is to provide an improved multiplying adjunct which is adapted to temporarily store a product of multiplication whose digit positions are equal to the sum of the digit positions of the multiplier and multiplicand and which stores for reproduction a substantially smaller number of digits.

Another object of this invention is to provide a multiplying system adapted to preprogram the maximum number of digits which can be formed in an accumulated product and which inhibits the erroneous completion of a product which would otherwise result from an inadequate preprogram in view of an excessive sum of digits in the multiplicand and multiplier.

A further object of this invention is to provide a multiplying system in which the digits in the completed product of accumulation are automatically aligned with the same columnar digit positions of a printer, notwithstanding the fact that during product accumulation other digits of the product are temporarily columnarly aligned with the printer.

A still further object of this invention is to provide means in a multiplying system for rapidly transferring and modifying the digits of an electronically stored product so that they can be mechanically reproduced.

In accordance with the primary features of this invention there is provided an accounting system having an accounting machine coupled to a multiplying adjunct. The accounting machine is capable of receiving and storing a multidigit multiplicand and multidigit multiplier. It is also adapted to receive and print a multidigit product of multiplication. The accounting machine has program facilities for controlling its normal arithmetic billing and listing operations and also for apply signals to the multiplying adjunct which trigger various sequences of operation necessary for multiplication.

The multiplying adjunct is a self-contained electronic apparatus which, except for the above mentioned program facilities, is capable of sequentially addressing and temporarily storing a digit of each the multiplicand and multiplier, forming and storing the partial product digits of their multiplication in a multistage product accumulator, successively adding the partial products as they are formed digit by digit until the true product is complete, sequentially discarding a predetermined number of least significant product digits as they are formed, but after carries are propagated, transferring to the acounting machine the automatically justified product of multiplication for printout, and preventing a printout if the system has exceeded its capacity.

Other objects and features of this invention will become apparent by reference to the following description taken in conjunction with the accompanying drawings in which:

FIG. 1 is a logic diagram of the elements of the accounting machine and the multiplying adjunct intercoupled to illustrate the basic multiplying operation;

FIGS. 2 through 8 are logic and schematic drawings of the basic building blocks of this inventive system. In particular;

Figure 9:
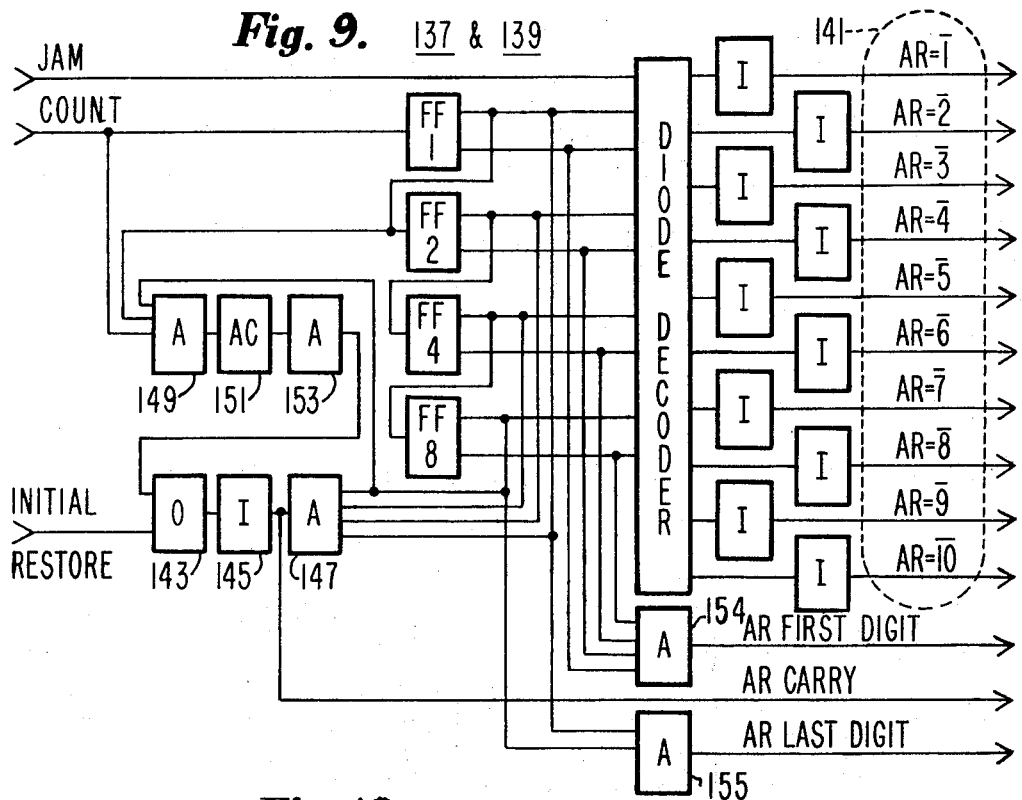
Figure 10:
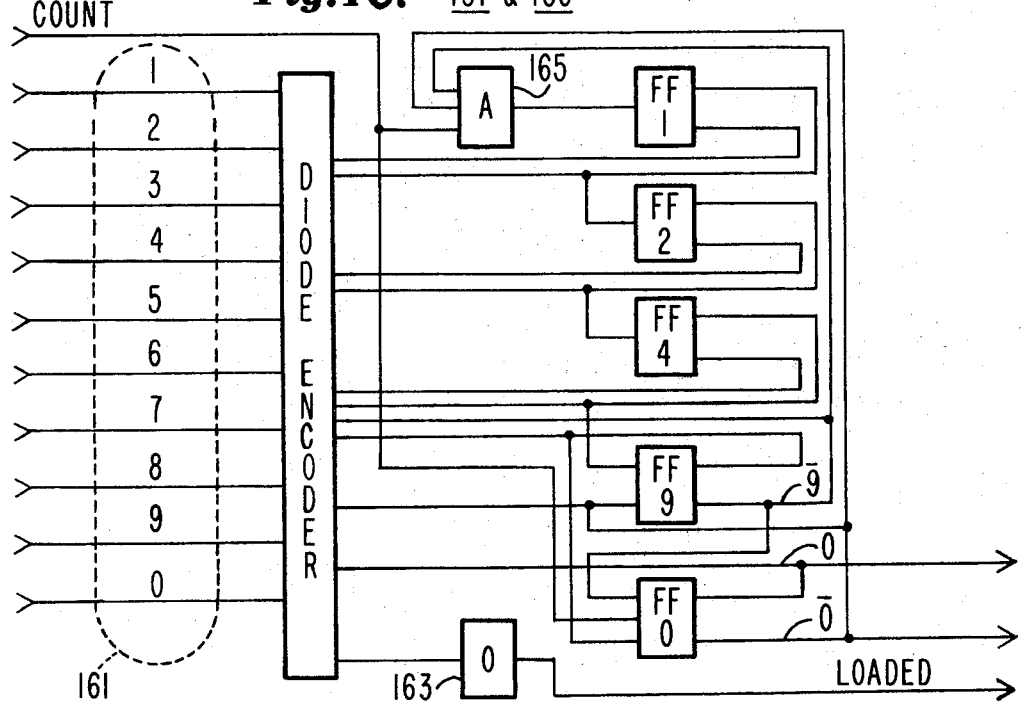
Figure 11:
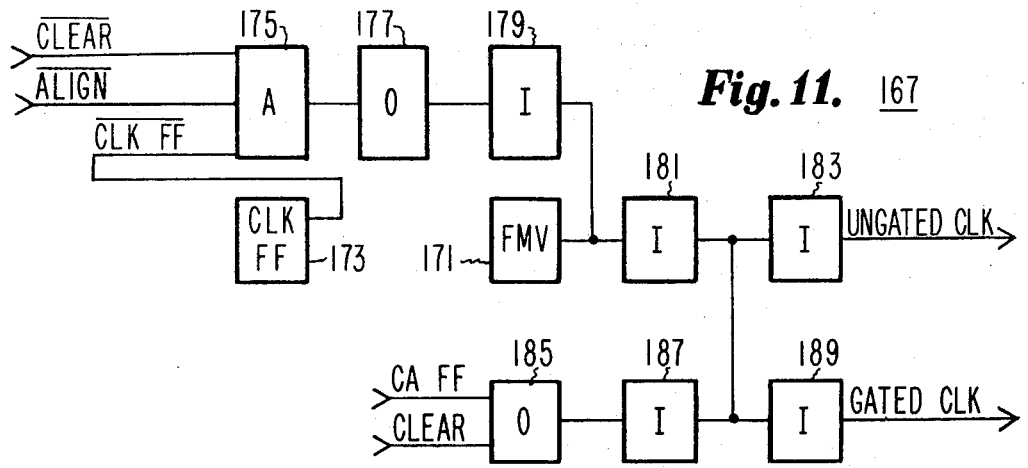
Figure 12:
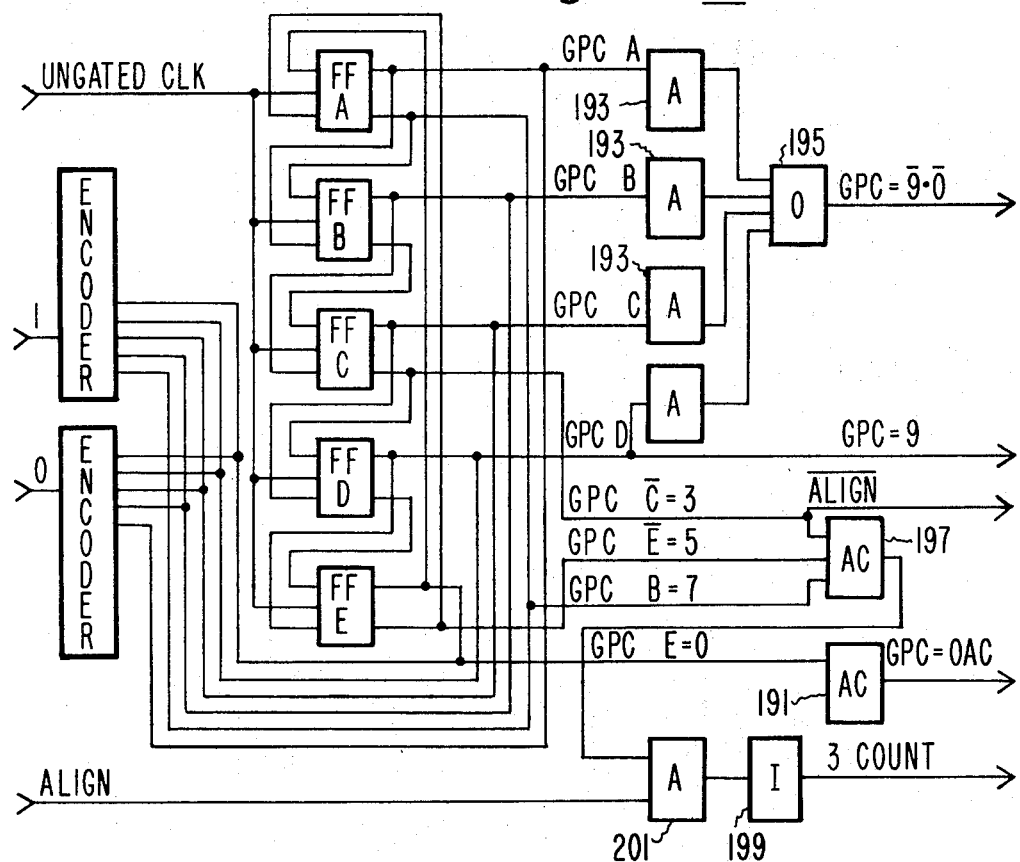
Figure 18:
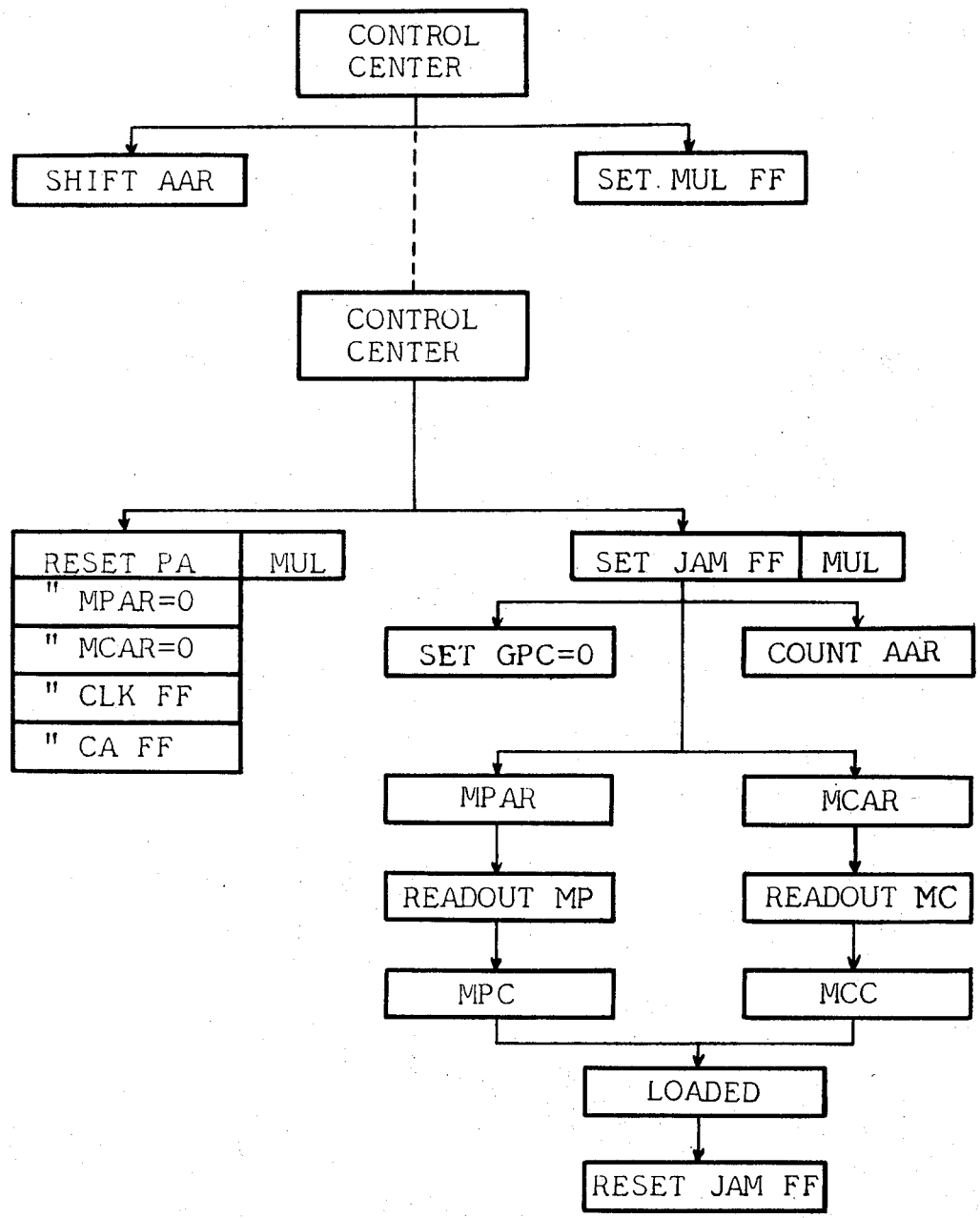
Figure 19:
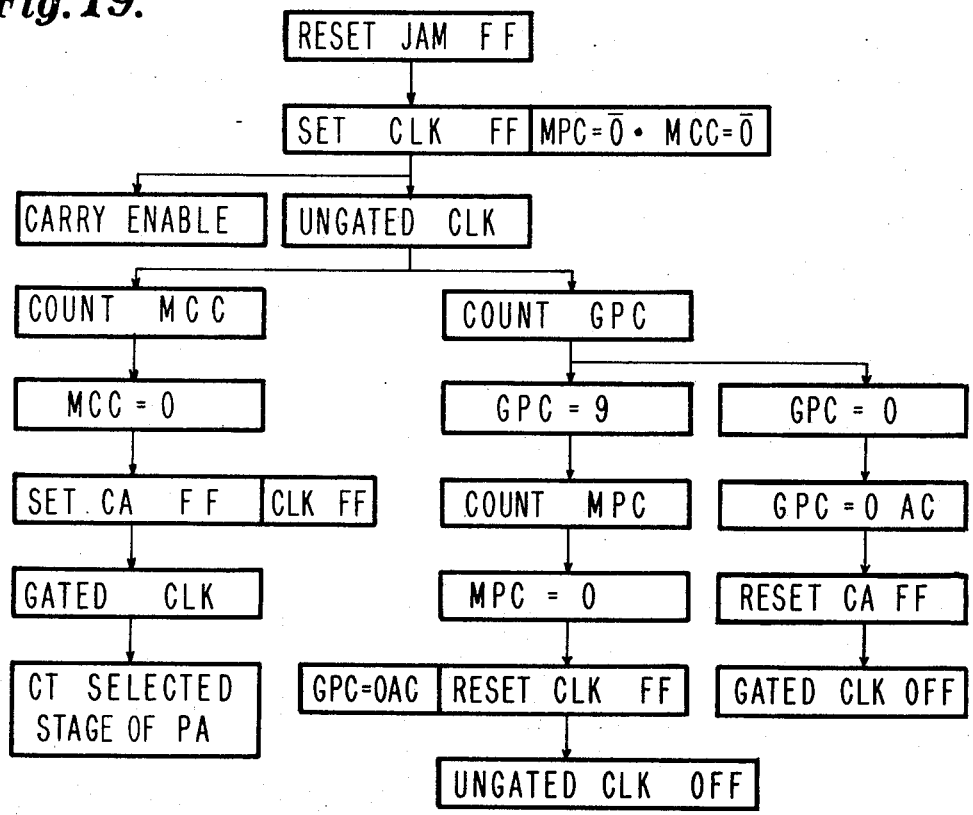
Figure 20:
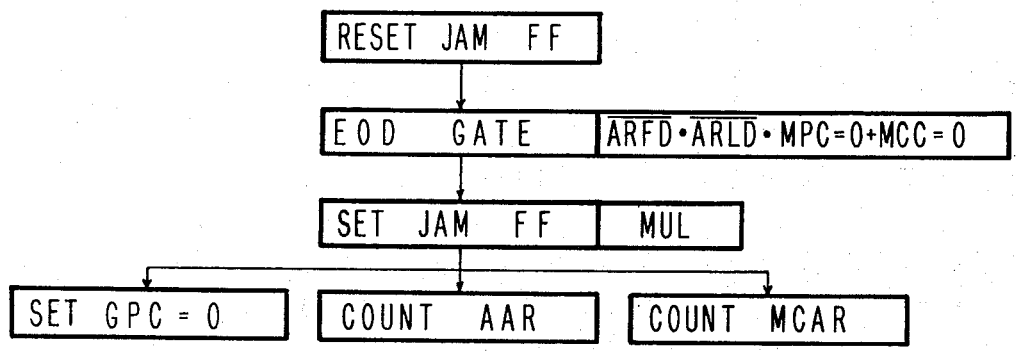
Figure 22:
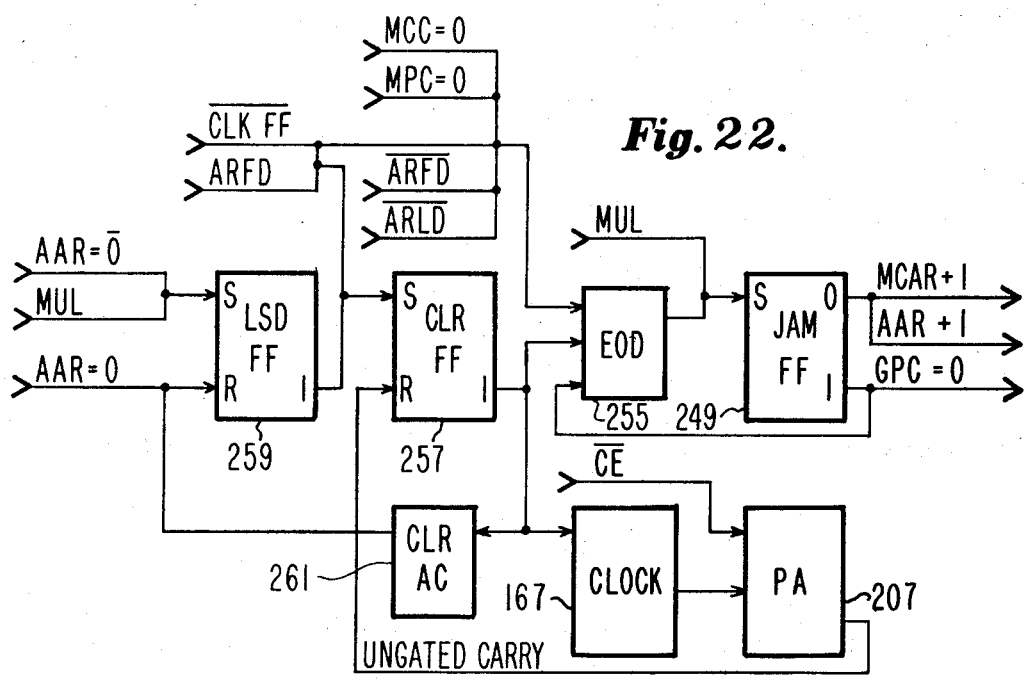
Figure 23:
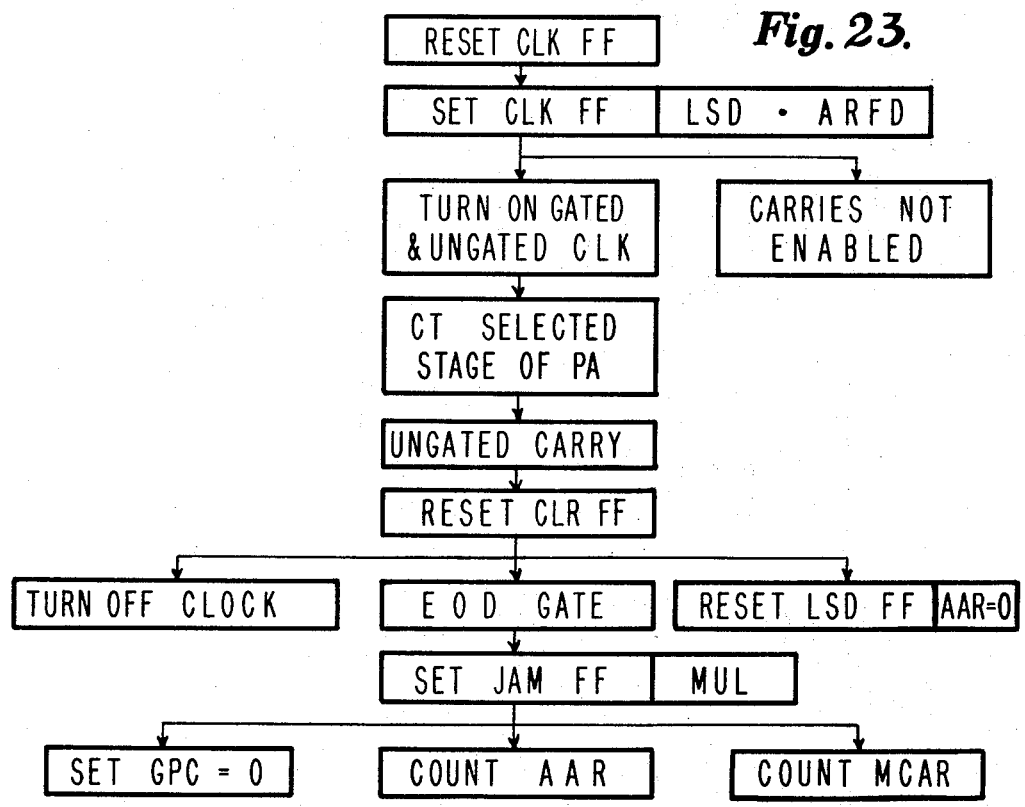
Figure 24:
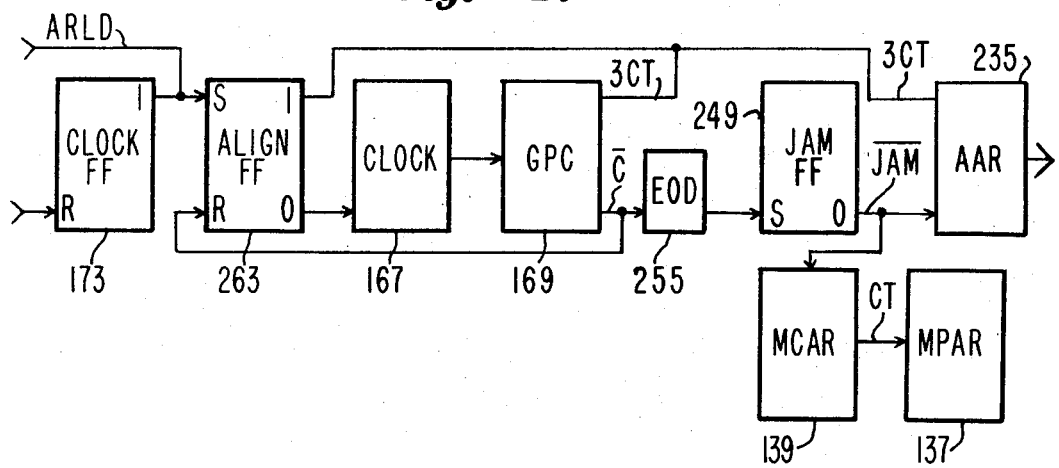
Figure 25:
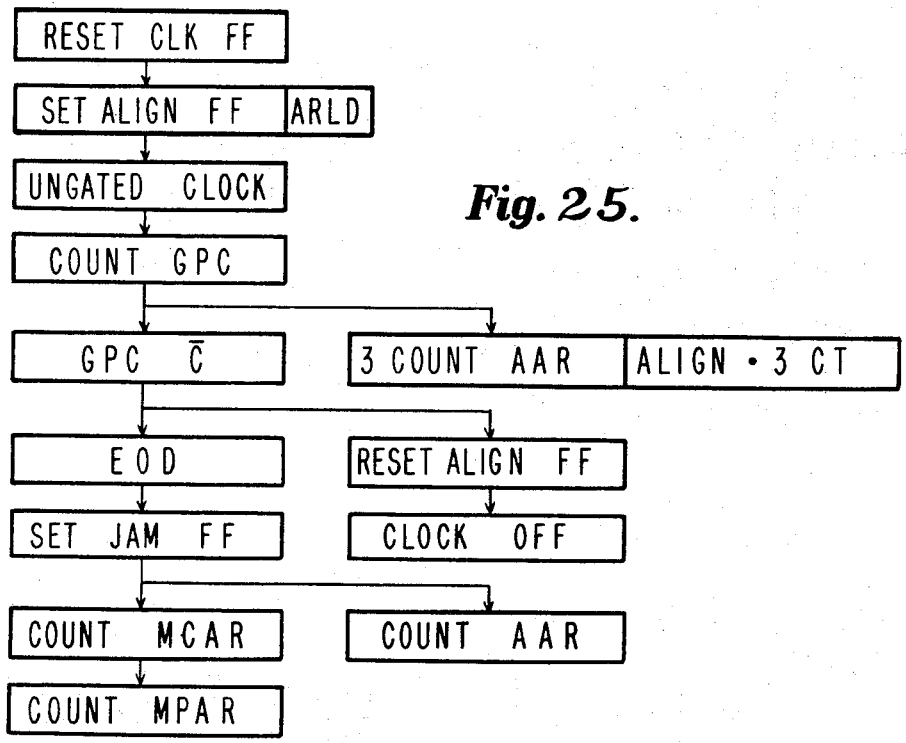
Figure 27:
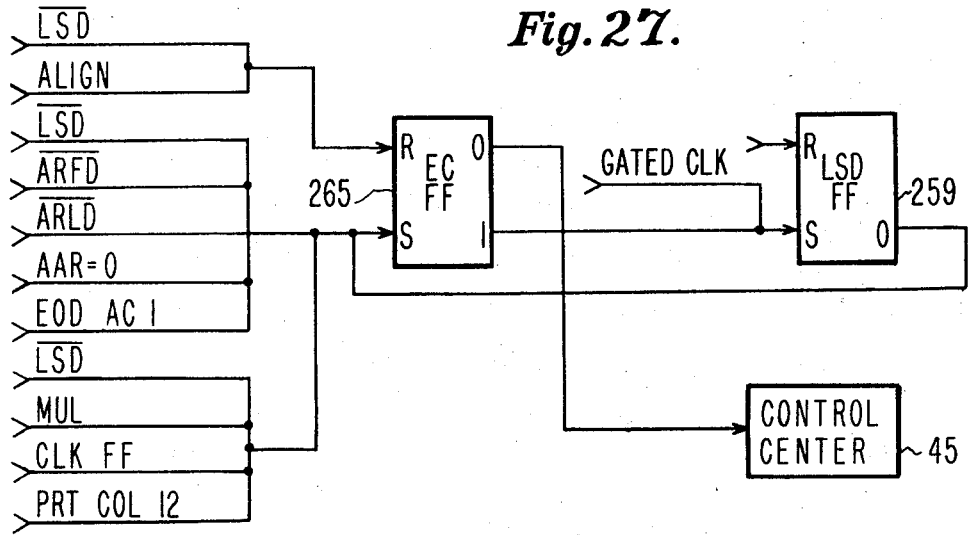
Figure 28:
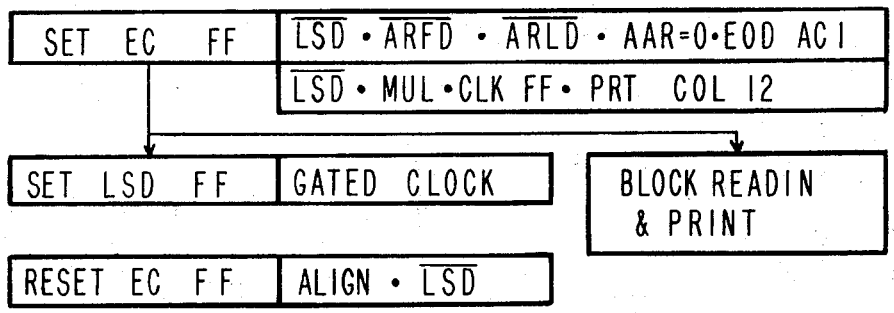
Figure 29:
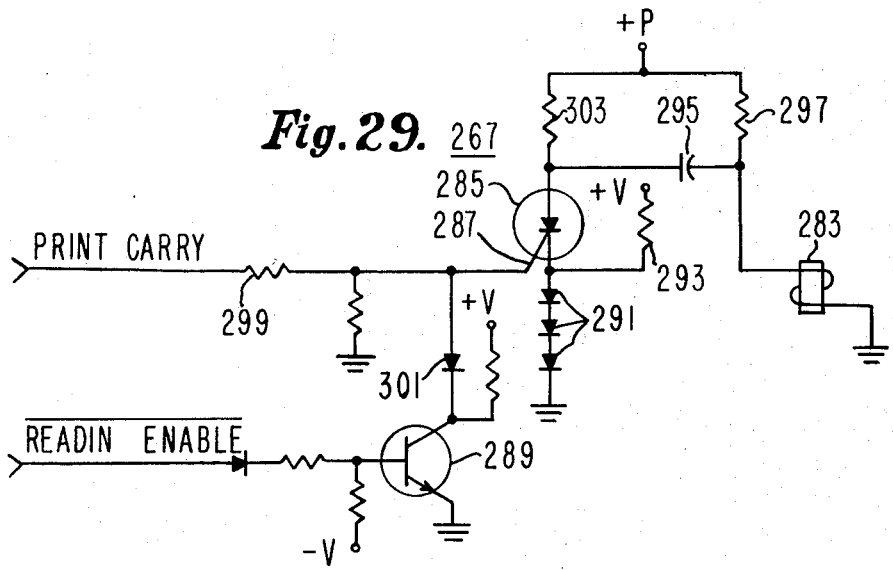
Figure 30:
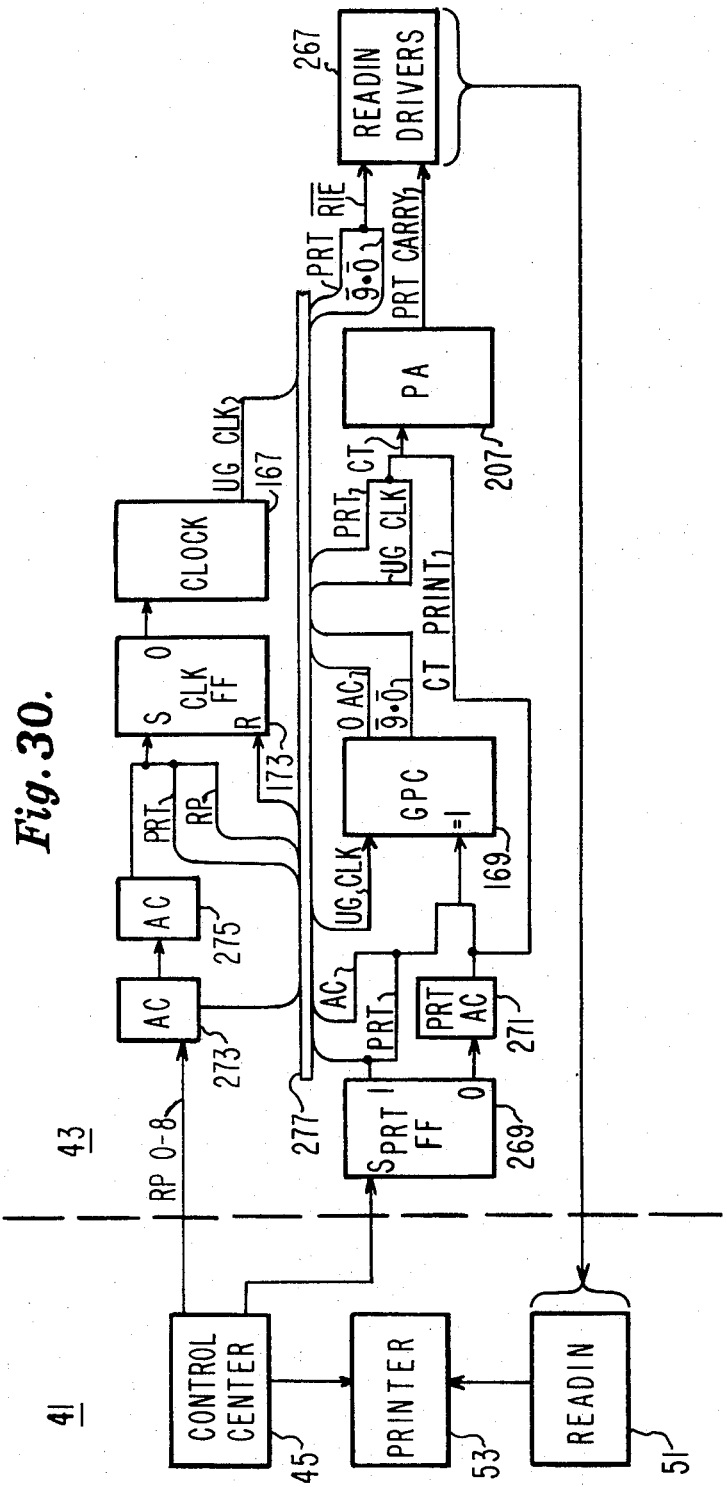
Figure 31:
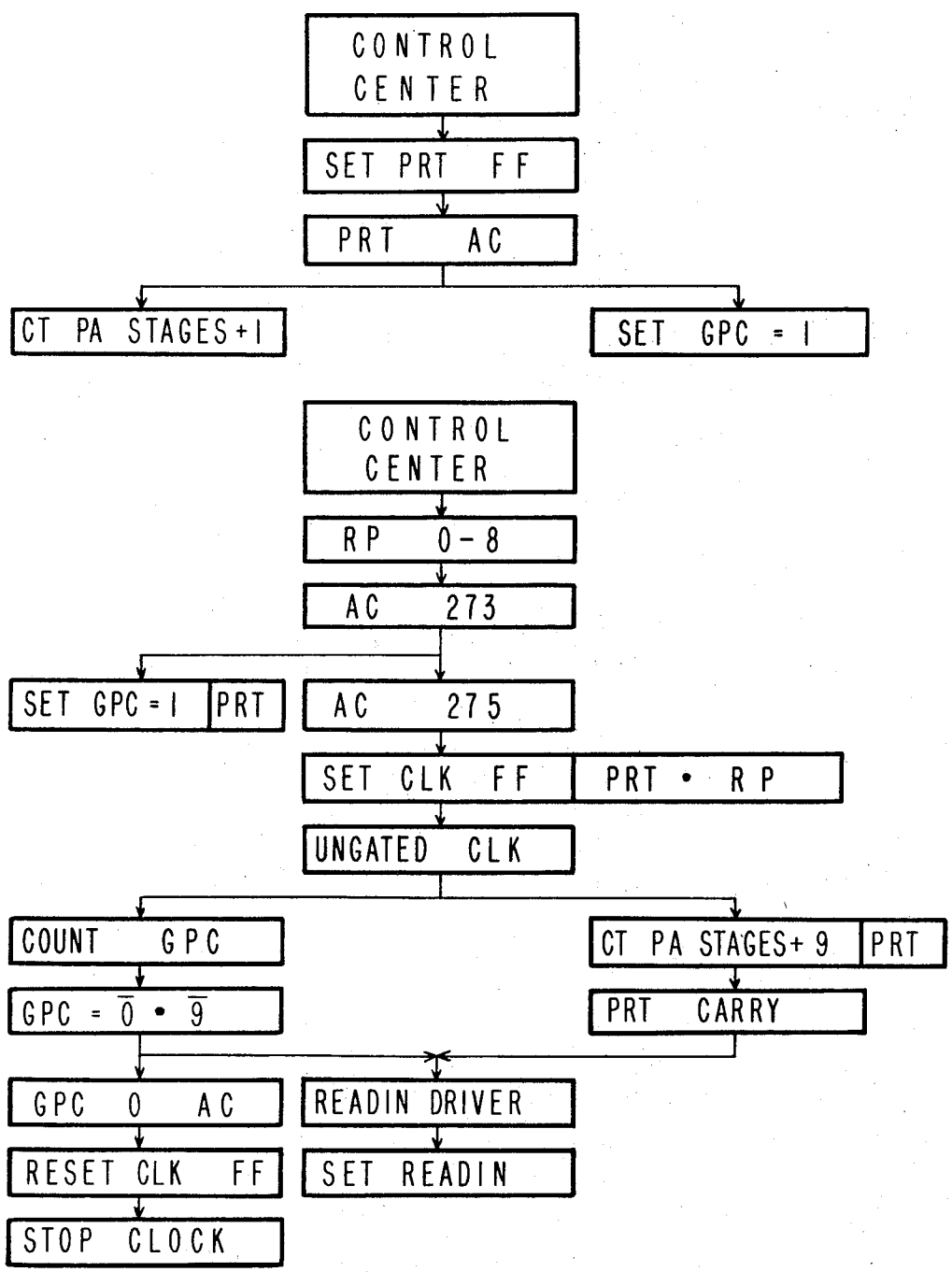

FIG. 2 illustrates and AND gate;
FIG. 3 illustrates an OR gate;
FIG. 4 illustrates an inverter circuit;
FIG. 5 illustrates an AC coupling circuit;
FIG. 6 illustrates a free running multivibrator;
FIG. 7 illustrates a set-reset flip flop;
FIG. 8 illustrates a complementing flip flop;
FIG. 9 is a logic diagram of the multiplier and multiplicand address registers—MPAR and MCAR;
FIG. 10 is a logic diagram of the multiplier and multiplicand counters—MPC and MCC;
FIG. 11 is a logic diagram of the clock circuit—CLOCK;
FIG. 12 is a logic diagram of the group pulse counter—GPC;
FIG. 13 is a logic diagram of the product accumulator—PA;
FIG. 14 is a schematic drawing of one stage of the PA;
FIG. 15 is a logic diagram of the product accumulator address register—AAR;
FIG. 16 is a schematic drawing of the diode encoder in the AAR;
FIG. 17 is a schematic drawing of the diode decoder in the AAR;
FIG. 18 is a flow chart of the preshift and start operations;
FIG. 19 is a flow chart of the multiply operation;
FIG. 20 is a flow chart of the factor 0 condition;
FIG. 21 is a presentation of an example problem;
FIG. 22 is a logic diagram of the elements in the multiplying adjunct which are employed at the end of the operation upon a particular multiplicand digit to cause the MCAR to advance to the next digit, to clear the resulting partial product from the PA, and to advance to the next stage of the PA;
FIG. 23 is a flow chart of the above described clearing and advancing operation;
FIG. 24 is a block diagram of the elements which are employed to advance the MPAR and the AAR and also to realign the AAR after all of the digits in the multiplicand have been operated upon by a digit of the multiplier, so that the partial product formed by the next multiplier digit is directed into the proper stages of the PA;
FIG. 25 is a flow chart of the above described advancing and realigning operation;
FIG. 26 is a table illustrative of the exceed capacity situation which enables the inhibiting of the transfer of a product from the multiplying adjunct to the accounting machine due to the fact that the accumulated product would be erroneous;
FIG. 27 is a logic diagram of the elements which are employed to detect an exceed capacity condition;
FIG. 28 is a flow chart of the exceed capacity operation;
FIG. 29 is a schematic drawing of the readin driver circuit;
FIG. 30 is a logic diagram of the elements employed in the print product operation; and
FIG 31 is a flow chart of the print product operation.

With reference to the logic diagram of FIG. 1, the elements to the left and right of the heavy dashed line are respectively those which normally would be contained in an accounting machine 41 and a multiplying adjunct 43 which are combined in the present multiplying system to accomplish the basic essentials of multiplication. The accounting machine 41 could take the form of any one of several commercially well known business machines. The system would be particularly useful if it employed an accounting machine of the type disclosed in United States Patent 2,629,549 to Butler and assigned to the assignee of the present invention. Although such an accounting machine, especially as improved and modified by several other patented features also assigned to the assignee of the present invention, accomplishes most of the required business calculations, high speed multiplication of factors indexed therein would be beyond its basic capabilities were it not for the coupling thereto of the subject multiplying adjunct 43. Neither illustrations nor a detailed description of the accounting machine or even portions thereof are considered essential to the understanding and practice of the present invention.

Again with reference to the left side of FIG. 1, the accounting machine 41 is an electromechanical mechanism capable of receiving and storing arithmetic data, operating upon the data in either a predetermined or an operator determined manner to produce a plurality of arithmetic resultants, storing the resultants, discretely and cumulatively, further interoperating upon the resultants, and reproducing, such as by printing, one or more of the resultants.

The internal operations of the accounting machine are directed by an electromechanical program and operations control center 45 which, at predetermined times during particular modes of operation, actuates mechanisms in the accounting machine to enable necessary machine functions. Also, as subsequently described, during the multiplication mode, the control center sends initiating and other control signals to the multiplying adjunct. The control center 45 also monitors certain of the system operations and will inhibit the completion of such operations if there arises an error condition.

The accounting machine 41 contains an electromechanical readout section which, for purposes of description, is illustrated as having a portion 47 and a portion 49, respectively designated as the multiplier readout and the multiplicand readout. The readout section receives and stores all the digits of the multiplier and multiplicand for subsequent transmission digit by digit into the multiplying adjunct 43. Accordingly, the term "readout" refers to the reading of data out from the accounting machine 41 and into the multiplying adjunct 43. United States Patent 2,955,758 issued to Jones, entitled "Rotary Readout and Storage Device," and assigned to the assignee of the present invention is well suited to perform the functions of the readout section portions 47 and 49.

The accounting machine 41 also contains a readin section 51 which, as its name implies, is operable to receive data from an external source, such as the multiplying adjunct 43, and manipulate mechanisms in the accounting machine in such a manner that the digital equivalents of the readin data can be reproduced by printing or the like. United States Patent 2,822,752 issued to Bradshaw et al., entitled "Differential Type Setting and Resetting Means," and assigned to the assignee of the present invention sets forth a readin mechanism capable of performing the functions required of the readin section 51. The Butler and Bradshaw patents also describe a suitable printer section, which performs the necessary function of a printer section 53, as shown in the accounting machine 41.

It soon will become apparent that the arithmetic values handled by this multiplying system are base ten digits employable for normal decimal notation. Although not discussed in particular, certain of the counting elements in the multiplying adjunct can also operate in a base twelve mode and thereby enable multiplication in the sterling monetary system.

In many instances, positive binary logic is employed in the operation of the elements of the multiplying adjunct and their building blocks. In a binary device the "1" state usually will be considered as the active state and the "0" state as the inactive state. Hereinafter, the term "low" will mean a voltage close to ground and "high" will mean substantially above ground level. All signals emanating from the "1" side of a bistable device, notwithstanding the fact that the signal level at a particular time is high or low, will be identified as a logically positive signal; whereas, all signals from the "0" side will be logically negative and be identified by an overriding bar notation. For example, a signal from the "1" side of the element designated as the muliply flip-flop, which will be discussed subsequently, is represented by "MUL" for multiply; whereas, a signal from its "0" side is represented by "$\overline{MUL}$" for multiply not.

*Building blocks*

Before describing each element of the multiplying adjunct, its internal operation, and its interrelationship with the other elements of the multiplying adjunct and the accounting machine, the electronic building blocks of these elements will be described briefly with reference to the schematic and logic drawings in FIGS. 2–8.

FIG. 2 illustrates an AND gate. A positive AND gate is defined as a device having one or more inputs and a single output. The output from the AND gate is high or true only when all of the inputs are high. The output is low or false when one or more of the inputs is low. When one or more of the inputs is low, a diode 55 in each of the low legs is forward biased to enable current to flow through a resistor 57 to a positive voltage source +V. Since very little voltage is dropped across the diodes in the low legs, most of the voltage drop is across the resistor 57 causing the output to be low. When all of the inputs are high, the voltage potential on both sides of each of the diodes is equal; therefore, no current flows through the resistor 57 and the output is high. A positive AND gate may also serve as a negative OR gate. If a low output signal is to be the usable signal level, then a low signal on any one or all of the input legs will result in a low output.

Another form of AND gate is the SHUNT AND gate. It comprises a single diode 55 having its cathode and anode coupled to the preceding and subsequent stages, as shown in FIG. 2; however, it has neither its own voltage source +V nor resistor 57, but uses those of the adjacent stages. The SHUNT AND gate may have a plurality of outputs.

FIG. 3 illustrates an OR gate. A positive OR gate is defined as a device having one or more inputs and a single output. The output from the gate is high or true when one or more of its inputs is high. The output is low or false only when all inputs are low. When any one or more of the inputs is high, which is equivalent to +V, a diode 59 in each high leg is forward biased and enables current to flow through a resistor 61 from a negative potential source −V to a +V signal level. Very little voltage is dropped across the diodes 59; hence, the major voltage drop is across the resistor 61 and causes the output to be high. When all of the inputs are low, which is equivalent to ground potential, the diodes 59 in all of the legs are forward biased and current flows through the resistor 61 from the negative potential source −V to ground. The voltage drop is over the resistor 61 and the output is low. A positive OR gate may also serve as a negative AND gate. If a low output signal is to be the usable signal level, then a low input signal on all legs of this gate results in a low output.

With reference to FIG. 4, there is illustrated an inverter. The inverter, as its name implies, provides a logical inversion of signals applied to its input. A grounded-emitter amplifier is used to perform the inversion in that it provides a high output when the input is low and a low output when the input is high. In addition, the inverter provides isolation between groups of logical stages and thereby prevents tendencies toward oscillation.

When the input signal to the inverter is low, the base of a transistor 63 is slightly negative with respect to its emitter. This causes the transistor to be cut off, prevents current from flowing through a resistor 65 from a potential source +V, and thereby produces a high output. When the input signal is high, the base of the transistor 63 is slightly positive with respect to its emitter. This induces the transistor to conduct from ground through the resistor 65 to the potential source +V. With the transistor thus conducting, the output signal will be low.

An AC coupling circuit is shown in the schematic and logic drawing of FIG. 5. This circuit is a type of delay element which requires a negative going input signal having a duration equal to or longer than the resultant output pulse. If the input signal is shorter in duration than the output pulse which this circuit is designed to produce, then the output pulse has the same time duration as the input.

Under static conditions, a transistor 67 is forward biased into conduction due to the application of a positive voltage to its base from a potential source +V. Current flowing from ground through the transistor 67 and a load resistor 69 clamps the output level low. When the input signal switches from high to low, this negative going voltage signal is coupled through a capacitor 71 to the base of the transistor 67 to turn the transistor off and cause the output of this AC element to go high. The transistor will remain cut off until the capacitor 71 discharges through a resistor 73 to the potential source +V. Subsequent thereto, the positive potential +V again turns on the transistor and again produces the low output.

It is primarily the time constant of the capacitor 71 and the resistor 73 which determines the cut off time of the transistor 67 and consequently the duration of the high output pulse.

When the input signal switches back from low to high, the positive going voltage signal, which is coupled to the base of the transistor through the capacitor 71, finds the transistor conducting. The charging of the capacitor is through a current limiting resistor 75 and the base-emitter junction to ground and does not affect the output, which remains low until the input signal next switches from high to low.

FIGS. 6–8 illustrate the thre basic forms of multivibrator circuits employed in the present multiplying system. A multivibrator is basically two amplifiers connected in a regenerative feedback fashion such that the output of one stage is coupled to the input of the other. This configuration enables one stage to control the other and provide an output switching action.

FIG. 6 discloses a free running multivibrator circuit which comprises a pair of transistors and an intercoupling network. This free running multivibrator "FMV" is an astable device which oscillates between two unstable conditions in an attempt to stabilize. The oscillation produces at the output of the circuit voltage changes in the form of a train of similar pulses having a uniform repetition rate.

The following static conditions exist when this FMV is turned off by the application of a ground signal to its input. Current through a load resistor 77 holds low the level at the collector of a transistor 79, the base of a transistor 81, and the output signal. The transistor 79 is on and current flows from a —V potential source through a resistor 83, a diode 85, and the base-emitter junction to ground, resulting in a slightly negative potential on the left side of a capacitor 87. The transistor 81 is partially conducting and the current flowing from the —V source through a resistor 89, a diode 91, and the base-emitter junction to ground applies a negative potential on the right plate of the capacitor 87 equal to that on its left plate.

A positive input signal turns on the FMV by raising the voltage on the base of the transistor 81 to drive it further into conduction. This results in a positive voltage change on the right plate of the capacitor which is reflected thereacross to reverse bias the diode 85 and the base-emitter junction of the transistor 79 to cause the latter to be cut off. As the left plate of the capacitor discharges to a slightly negative potential through the resistor 83, the diode 85 and the base-emitter junction of the transistor 79 is again forward biased to thereby induce that transistor to turn back on. Collector current is thus enabled to flow through the resistor 77 and causes the base of the transistor 81 to go low. A low signal on the base of the transistor 81 and a positive charge on the right plate of the capacitor forces this transistor to be cut off. The transistor 81 remains off, the transistor 79 remains on, and the output signal remains low until the right plate of the capacitor discharges to a slightly negative potential through the resistor 89. Thereupon, the transistor 81 again turns on and the collector current, through the +V potential source, produces a voltage rise on the right plate of the capacitor which is reflected across the capacitor to again cut off the transistor 79 and create a high output from the FMV.

The switching sequence, as above described, will continue as long as the input signal level is high. The time interval that the FMV output is high or low is determined by the discharge time of the capacitor 87 through the resistors 83 or 89. By choosing discharge resistors of equal value, the time interval at each level is made equal; therefore, the resultant output of this free running multivibrator is a train of positive pulses spaced apart by a time equal to their duration.

A conventional bistable multivibrator or set-reset flip flop is set forth in FIG. 8. This circuit has two stable states or conditions of equilibrium, Set and Reset, and is able to switch from one state to the other at a high rate of speed. This form of flip flop has a pair of inputs and a pair of outputs. Since the circuit is binary in nature, its outputs may be labeled "1" and "0" as shown in FIG. 8. When the flip flop is set, the "1" output is high and the "0" is low. When the flip flop is reset, the "1" output is low and the "0" output is high.

Under static conditions, assuming that the flip flop is set, a transistor 93 is on and a transistor 95 is off. The base of the transistor 93 is slightly positive and the "1" output is high due to current flowing from a —V potential source through a trio of resistors 97, 99, and 101 to a +V potential source. The transistor 93 conducts through a load resistor 103 to +V, its collector is at ground, and there is produced a low signal at the "0" output. The base of the transistor 95 is slightly negative due to current flowing from —V through a pair of resistors 105 and 107 to the collector of the transistor 93.

This flip-flop is designed to be triggered when a high signal is applied either to the Set or Reset input, only if the circuit is in its respectively opposite condition. Assuming as above that the flip flop is set, a high signal applied at the Reset input forward biases the base-emitter junction of the transistor 95, turns it on, and induces the "1" output to go low due to collector current flowing through the load resistor 101. There results a change in the voltage dividing network which causes the base of the transistor 93 to go negative and produces a reverse bias on its base-emitter junction which turns this transistor off. The "0" output goes high and maintains the positive potential on the base of the transistor 95 due to voltage divider action from the potential source —V through the resistors 105, 107, and 103 to the +V source.

Assuming the flip flop to be reset, a high signal applied to the Set input would instigate a repetition of the above switching analysis except that the transistor 93 would then be switched on and the transisor 95 switched off. In lieu of applying a high input to initiate a particular switching action, a low signal may be applied to the collector of the same transistor to produce the same switching action.

With reference to FIG. 8 there is shown the schematic drawing and the logic symbol for a complementing flip flop. The complementing flip flop is a single input device designed such that a trailing edge or low going signal applied at its input will reverse the existing condition of its two outputs, each of which is coupled to one of a pair of transistors 109 or 111. A comparison of FIGS. 7 and 8 readily points out that the set-reset flip flop and the complementing flip flop are structurally the same, except for their input steering networks. Accordingly, once a pulse into the input steering network of the complementing flip flop induces a change in potential at the base of either of the transistors 109 or 111, there will follow the same bistable switching action described for the set-reset flip flop.

Under static conditions, assuming that the flip flop is set, the transistor 109 is on, the transistor 111 is off, the "1" output is high, and the "0" output is low. This results in a positive voltage charge being applied through a resistor 113 onto the right plate of a capacitor 115 and a ground potential being applied through a resistor 117 onto the left plate of a capacitor 119. Upon the application of the trailing edge of a pulse to the COMPLEMENT input, this negative going signal is reflected across the capacitors 115 and 119 and elicits a negative change in the voltage on the right plate of the capacitor 115 and on the left plate of the capacitor 119. The voltage on the right plate of the capacitor 115 drops close to ground potential, yet maintains a sufficient charge with respect to a diode 121 to hold it reverse biased so that the capacitor 115 discharges through the resistor 113. However, the potential on the left plate of the capacitor 119 drops to a sufficiently negative potential to forward bias a diode 123 which thereby enables the application of this negative potential to the base of the transistor 109 to turn it off. The capacitor 119 then discharges through the diode 123 and a pair of resistors 125 and 127 to a +V potential source until its left plate attains a positive charge. When the transistor 109 is cut off, the "0" output is high and the positive potential +V is supplied to the base of the transistor 111 by the voltage divider formed by a pair of resistors 129 and 131. The +V potential holds on the transistor 111, produces a low at the "1" output, and thereby couples a negative potential to the base of the transistor 109 by voltage divider action, which includes the application of a −V potential through a resistor 133, to hold off the transistor 109.

The next time a trailing edge is applied to the COMPLEMENT input, the negative going signal is reflected across the capacitors 115 and 119 to produce a negative potential on the right plate of the capacitor 115. This negative potential forward biases the diode 121, cuts off the transistor 111, and causes the flip-flop to switch back to its set state; thus, completing the cycle of operation.

Between the negative going or trailing edge signals which trigger the succesive setting and resetting of this flip flop there obviously must be positive going or leading edge signals. Such positive signals, although they elicit potential changes on the capacitors, do not trigger switching action. The complementing flip-flop can be set or reset by respectively grounding the collector of the transistor 109 or 111.

The basic building blocks will now be combined to form several of the counting and addressing elements shown generally in the multiplying adjunct 43 of FIG. 1. However before so doing, let it be assumed with respect to the accounting machine 41 that the multiplier and multiplicand readout portions 47 and 49 each have a ten digit capacity and that the readin section 51 and the printer section 53 each can accommodate twelve digits.

*Factor address registers*

Once the multiplier and multiplicand factors are indexed into the accounting machine 41 and the readout portions 47 and 49 in accordance with the normal operations of these apparatus as taught by the above cited Butler and Jones patents, then it is necessary to address a digit, the least significant of each factor, temporarily store it in the multiplying adjunct, and initiate a coaction therewith to produce a partial product of multiplication. The factor digit addressing is accomplished by a multiplier address register—MPAR—137, which addresses the readout portion 47 and a multiplicand address register—MCAR—139 which addresses the readout portion 49.

The MPAR and MCAR are logically the same as shown in FIG. 9. These factor address registers each contain four complementing flip flops, of the type shown in FIG. 8. The flip flops are intercoupled, as shown in FIG. 9, to form a binary counter and are respectively labeled FF1, FF2, FF4, and FF8 according to their binary valve. The outputs from the flip flops are gated through a diode decoder network comprising ten multi-input AND gates. This decoder has ten discrete output lines entitled AR=1 through AR=10. As shown, these output lines are individually coupled through ten inverter circuits to form the address register outputs AR=$\bar{1}$ through AR=$\overline{10}$, which are discretely connected to ten different inputs in the associated readout section. The address output lines from the factor address registers are generally designated in FIG. 1 by a pair of similar conductors 141.

As above stated, the readout sections 47 and 49 are each capable of storing ten discrete decimal digits. In order for the MPAR 137 or MCAR 139 to address a particular digit position or column in its associated readout section, that numbered output line in the conductor 141 must be low. To accomplish the selective column addressing and transfer a particular factor digit from the accounting machine into the multiplying adjunct, the factor address registers operate as follows.

At the start of a multiply operation, a positive pulse is applied to an INITIAL RESTORE input, which in FIG. 1 is designated as "IR." There results a high signal through an OR gate 143 which is inverted by an inverter 145 to provide a low signal to an AR CARRY output, which is designated in FIG. 1 as "CO," and also through a single input AND gate 147. The AND gate 147 has four outputs which are individually coupled to the collectors on the "1" side of each of the complementing flip flops in the manner of a SHUNT AND gate to form a 0 count encoder; for, as previously described, the application thereto of a low signal results in the resetting of each flip flop and places the binary counter in the 0 count condition.

Upon the application of a positive signal to an input, designated in FIG. 9 as "JAM" and in FIG. 1 by "J," the high output from the "0" side of each reset flip flop is gated with a JAM signal by AND gates in the diode decoder. The gated signals elicit a low output at only the AR=$\bar{1}$ output line to thereby address the first position or column in the readout section coupled thereto. Signals from preceding logic stages are then applied to a COUNT input line and are coupled to the input of the FF1. Upon the receipt of each negative going signal, the binary counter is advanced one position. The decoded output is also advanced one position to address the next higher column of the readout section. It should be noted that the numeric value of the address register and the column addressed thereby is always one unit higher than the value in the binary counter; i.e., the counter sequentially advances from 0 to 9 while the columns in the readout section are being sequentially addressed from column 1 through column 10.

The COUNT input signals are also gated with the outputs from FF1 and FF8 via an AND gate 149. The output of this gate remains low until the binary counter reaches 9. When the counter is stepped or counted to 9, the three inputs to the AND gate 149 go high and cause its output to go high. The next negative going signal applied to the COUNT line elicits a low output from the AND gate 149 which triggers an AC coupling element 151. The resulting positive output pulse from the AC element is coupled through an AND gate 153, the OR gate 143, and the inverter 145 to the AND gate 147 to generate a reset pulse to place the binary counter back to its 0 position in the same manner as the above described INITIAL RESTORE operation. The "not" side of each of the four flip flops is gated through an AND gate 154 to provide an address register first digit output—ARFD. The FF1 and FF8 outputs are applied to the AND gate 155 to provide an address register last digit output—ARLD.

As shown in FIG. 1, the AR CARRY output from the MCAR 139 is coupled back to the COUNT input of the MPAR 137, which for clarity is labeled "CO" rather than "CT." Accordingly, each time the MCAR counts or advances from 9 to 0, the MCAR CARRY output advances or counts the MPAR one decimal position. Such operation is equivalent to longhand multiplication wherein, after forming the partial product of a multiplier digit and the most significant digit in the multiplicand, the next more sgnificant digit of the multiplier is employed to form a partial product with the digits in the multiplicand.

As shown in FIG. 1, the MPAR CARRY output is not employed. Additionally, during the INITIAL RESTORE operation, the MCAR CARRY output is inhibited by gating elements not shown.

*Factor counters*

The act of addressing a particular column in the multiplier readout section 47 and the multiplicand readout section 49 enables the digit value stored in each addressed column to be transferred respectively to a multiplier counter—MPC—157 and a multiplicand counter—MCC—159. The MPC 157 and the MCC 159 are logically the same; therefore, in FIG. 10 only one of them is shown.

These factor counters basically comprise five flip flops and a SHUNT AND gate encoder network. The five flip flops form a hybrid counter in which FF1, FF2 and FF4 are complementing flip flops which are combined to count from 1 to 8 in a binary manner. FF9 and FF0 have capacitor coupled input steering networks and are interconnected such that they count independently their respective decimal values. This type of counter is employed to provide noise free outputs when the counter is set at 0 and $\bar{0}$.

In FIG. 10 the encoder is shown as having ten separate inputs 1 through 0. Each of these input lines is coupled to a single digit value in each of the ten columns of the associated readout section 47 or 49. Accordingly, each of the ten digit input lines of a factor counter is coupled to ten output decimals in its associated readout section. In FIG. 1, a pair of conductors 161 represent the coupling between the readout sections and the MPC and MCC.

In a subsequent deescription of a multiply operation, it will become apparent that the outputs from the multiplicand readout section 49 are coupled to the same digit value inputs in the MCC 159; however, the inputs to the MPC 157 are the tens complement of the outputs from the multiplier readout section 47.

The multiplier and multiplicand factor counters are responsive to low or negative going input signals. A low signal to any one of the encoder inputs of each factor counter causes an output line entitled "LOADED" to go low via an OR gate 163. This low output is used to indicate that the address register output signals were applied through the readout sections 47 and 49 to load the factor counters 157 and 159.

A low input signal routed through the diode encoder gates sets or resets each flip flop. This results in the counter being set to the selected input value. For example, a low signal at the 1 input resets all five flip flops and thereby sets the counter to 1.

Negative going signals are also applied to a COUNT input to incrementally step the counter during the multiply operation. As shown, the COUNT input is connected to an input of the FF0 flip flop and is gated by an AND gate 165 with the $\bar{9}$ and $\bar{0}$ output signals to provide selected COUNT input signals to the input of FF1.

The application of the negative portion of a COUNT signal to FF0 causes it to change state only when FF9 was just previously set or when FF9 was just previously reset and FF0 is in the set condition. This is due to the operation of the steering network of the flip flop FF0 which is a combination of that described with reference to FIGS. 7 and 8. Because of the logical coupling, as the counter advances from 8 to 9, the low COUNT input signal is gated with the $\bar{9}$ and $\bar{0}$ outputs to cause the output from the AND gate 165 to switch from high to low. When the counter is at 9 or 0, the $\bar{9}$ and $\bar{0}$ outputs remain low, the output from the AND gate also remains low, and the COUNT input signals to the flip flop FF1 are blocked.

The following table sets forth the set (S) or reset (R) state of the flip flops as the counter changes from 1 to 0.

| COUNT | FF 1 | FF 2 | FF 4 | FF 9 | FF 0 |
|---|---|---|---|---|---|
| 1 | R | R | R | R | R |
| 2 | S | R | R | R | R |
| 3 | R | S | R | R | R |
| 4 | S | S | R | R | R |
| 5 | R | R | S | R | R |
| 6 | S | R | S | R | R |
| 7 | R | S | S | R | R |
| 8 | S | S | S | R | R |
| 9 | R | R | R | S | R |
| 0 | R | R | R | R | S |

*Clock*

Once a digit of the multiplier and the multiplicand are temporarily stored respectively in the MPC 157 and the MCC 159, the next obvious step is to generate their product, which becomes a portion of the many partial products of the multiplication problem. The subject multiplying system employs in its multiplying adjunct 43 two major elements for generating the partial products, they are a pulse generator or clock circuit—CLOCK—167 and a decimal group pulse counter—GPC—169.

The pulses generated by the CLOCK 167 are basically timing pulses used to synchronize the various electronic operations that take place in the multiplying adjunct. When the CLOCK is turned on, it provides a continuous stream or train of regularly spaced pulses at an UNGATED CLOCK output. When properly enabled, the CLOCK provides a group of pulses at a GATED CLOCK output. The UNGATED CLK pulses are used in the system to advance various counters in a continual sequence. The GATED CLK pulses are each used to enter a unitary amount into the product accumulator.

As shown in the logic drawing FIG. 11, the CLOCK 167 comprises a free running multivibrator—FMV—171, the operation of which was discussed with reference to FIG. 6; a clock flip flop—CLK FF—173, which is the set-reset device shown in FIG. 7; as well as several inverters, OR gates, and an AND gate 175. The AND gate 175 operates as a negative OR gate. Normally, the three inputs to this gate are high and evoke a high output that is coupled through an OR gate 177 and is then inverted by an inverter 179. The resulting low signal is applied to the input of the FMV 171 at the collector of its transistor 79, as shown in FIG. 6, and holds the FMV and thereby the CLOCK in the off mode. However, when the CLK FF 173 is set, the $\overline{\text{CLK FF}}$ signal goes low and induces a low output from the AND gate 175 which is inverted high by the inverter 179 to turn on the FMV 171.

It has been found that the output from the FMV does not supply sufficient power to drive succeeding stages of logic; therefore, the FMV output is coupled to a first pair of inverters 181 and 183, each of which amplify current and in combination provide signals at the UNGATED CLOCK output which are in phase with the FMV signals.

The GATED CLOCK output is controlled by the output of an OR gate 185 which is coupled through a second pair of inverters 187 and 189. The two input signals to the OR gate 185 are normally low, hence its output is low. This results in a high output from the inverter 187. In series between the inverter 181 and the junction between the inverters 187 and 189 is a resistor (not shown) which forms a resistive gate. In series between the inverter 187 and the junction is another resistive gate (not shown). The latter in combination with the resistor 65 in the inverter 187 and the resistor coupled to the —V source in the inverter 189 (see FIG. 4) provide a voltage divider action which maintains a positive potential on the base of the transistor 63 in the inverter 189. This potential continues even though the FMV is running and low signals are appearing at the top of the first mentioned resistive gate. When one or more of the inputs to the OR gate 185 goes high, its output goes high and causes the output of the inverter 187 to go low. This enables the output of the inverter 181 to control both the UNGATED and GATED CLOCK outputs; for, when the output of the inverter 181 is high, both the UNGATED and GATED outputs are low, and when the output from the inverter 181 is low, both the UNGATED and GATED outputs are high. Accordingly, the inputs to the AND gate 175 determine if the CLOCK 167 is on and thereby generating UNGATED CLK pulses; whereas, the inputs to the OR gate 185 determine if, in addition to the UNGATED CLK pulses, there is also transmitted GATED CLK pulses.

The UNGATED CLK pulses are primarily directed to the MCC 159 and the GPC 169 which are thereby simultaneously and incrementally advanced by a train of ten pulses. As later to be described in detail, the GPC is initially set at 0 and the MCC is preset at the particular value of a multiplicand digit. Assuming the MCC to be preset at a value of other than 0, it will be advanced through 9 and back to 0 before the GPC again attains 0. Once the MCC attains 0, the GATED CLK pulses are enabled via the CA FF input into the OR gate 185. The GATED CLK pulses will terminate upon GPC reaching 0; however, by that time there will be generated a group of GATED CLK pulses equal to the value preset into the MCC.

*Group pulse counter*

As set forth in FIG. 12, the group pulse counter 169 primarily comprises five complementing flip flops labeled FF A through FF E. The complement input of each flip flop is connected to an UNGATED CLOCK input. The two outputs of each flip flop are connected to the next succeeding flip flop via the cathodes of the latter's input steering diodes 121 and 123 shown in FIG. 8 to provide a gated steering network. Additionally, one output of each flip flop is coupled to a pair of input diode AND gate encoders, and both outputs of the FF A are so coupled. Because of this configuration, a low signal applied at the 0 input is routed through one encoder to reset all five flip flops and thereby set the counter to 0; whereas, a low signal applied at the 1 input is routed through the other encoder to set FF A and reset the FF's B, C, D and E to place the GPC at 1.

The trailing or negative going edge of each UNGATED CLK pulse attempts to complement each of the flip flops; however, the input steering network allows only one flip flop to be complemented by each pulse. This results in the flip flops being set (S) or reset (R) as the counter changes from 0 to 9 in the sequence shown in the following table.

| COUNT | FF A | FF B | FF C | FF D | FF E |
|---|---|---|---|---|---|
| 0 | R | R | R | R | R |
| 1 | S | R | R | R | R |
| 2 | S | S | R | R | R |
| 3 | S | S | S | R | R |
| 4 | S | S | S | S | R |
| 5 | S | S | S | S | S |
| 6 | R | S | S | S | S |
| 7 | R | R | S | S | S |
| 8 | R | R | R | S | S |
| 9 | R | R | R | R | S |

When GPC is counted to 0, FF E is reset and its "1" side goes low. This negative change in voltage triggers an AC element 191 which applies a positive pulse to the GPC=0 AC output. This positive pulse is gated with other logic signals to turn off the CLOCK. When one or more of the flip flops A, B, C, or D is set, its "1" side goes high and creates a high signal at the GPC=$\overline{9 \cdot 0}$ output via one or more of four single input AND gates 193 and an OR gate 195. When the GPC is counted to 9, the low output from the "1" side of FF D is directly coupled to the COUNT input of the MPC 157 to advance that counter one stop. When the flip flops A, B, C, and D are all reset, as they are at the count of 0 and 9, the GPC=$\overline{9 \cdot 0}$ output will be low. This low signal is, as described subsequently, gated with other logic signals to enable the printout of an accumulated product.

When the GPC counts to 3, 5 and 7, three negative pulses are made available at a 3 COUNT output via an AC element 197 and an inverter 199 for a product accumulator realignment operation. At specific times during a multiply operation an ALIGN input is high into an AND gate 201. When gated with the high output from the AC element 197, the ALIGN signal transmits a high input into the inverter 199 to cause the 3 COUNT output to switch from high to low for the duration of the output from the AC element 197. When the GPC is advanced from 7 to 8, FF C is reset and the GPC $\overline{C}$ output goes high. This signal is coupled to other logic, described hereinafter, to produce an $\overline{\text{ALIGN}}$ input into the AND gate 201 and also to turn off the CLOCK via the inputs to its AND gate 175 (see FIG. 11).

*Product accumulator*

The CLOCK 167 transmits all of the GATED CLK pulses into a product accumulator—PA—207. The PA, as shown logically in FIG. 13, comprises a plurality of stages 209 consecutively numbered 1 through 12. At the completion of the generation of all partial products, each of the stages 209 stores one decimal digit of the final product. Thereupon, a uniquely timed propagation of a PRINT CARRY output "PRT C" from each stage transfers its stored digit value to the stage's fixedly associated column in the readin section 51 of the accounting machine 41.

Each accumulator stage has three distinct inputs. At the beginning of a multiplication operation, a reset pulse is simultaneously applied to an INITIAL RESTORE, input "IR" of each stage to set it to the 0 count position. During the multiplication operation, each accumulator stage is consecutively and uniquely addressed to receive GATED CLK pulses into a COUNT input "CT." Whenever a stage counts past 9, it produces a GATED CARRY or tens carry pulse "GC" which, as shown, is coupled into the COUNT input of the next higher stage. Of particular importance is the fact that the GATED CARRY output of the last or twelfth stage is coupled back to the COUNT input of the first stage. As subsequently described, during the print product step the tens carries are not to be transferred; accordingly a CARRY ENABLE input "CE" is employed to control the timing of the transmission of GATED CARRY pulses.

FIG. 14 illustrates one stage 209 of the product accumulator 207. United States Patent 2,102,239 issued to Chen et al., entitled "Counter Employing Quantizing Core to Saturate Counting Core in Discrete Steps to Effect Countdown," and assigned to the assignee of the present invention, embodies the subject accumulator stage and describes its operation sufficiently that only the following general description should be necessary to one skilled in the art.

The counter stage 209 comprises three major portions—a quantizing section 211, a transfer loop 213, and a counting section 215. The quantizing section 211 has a COUNT input which is coupled to an OR gate 216 having COUNT MULTIPLY, GATED CARRY, and COUNT PRINT as its three inputs.

The main element in the quantizing section is a bistable core 217 which is set upon the receipt of each pulse at the COUNT input and thereupon propagates to the counting section 215, via the transfer loop 213, a single pulse of uniform energy content; i.e., a quantized pulse. Subsequent to the setting of the core 217, it is automatically reset through application of current in a winding 219 from a +V voltage source through a resistor 221.

The counting section 215 contains two major elements—a multistable, incrementally steppable magnetic counting core 223 and a transistor 225, which operates in the mode of a blocking oscillator. There are two ways by which magnetic flux can be applied to the counting core 223 and respectively attain its setting and resetting. The first is via a set winding 227 which is part of the transfer loop 213. A quantized pulse into the winding 227 incrementally switches the counting core 223 a predetermined discrete amount toward positive saturation. The second is through a reset winding 229 which, in the beginning of the multiply operation, receives a pulse from the INITIAL RESTORE input through the transistor 225 as previously mentioned. Assuming a decimal mode of operation, the initially reset core 223 is capable of receiving ten quantized pulses before it becomes saturated. Prior to the receipt of the tenth pulse, the transistor 225 is biased into nonconduction because of a relatively high impedance in the winding 227 and voltage divider action of other elements in the transfer loop 213, including a bias source —V. During the receipt of the tenth quantized pulse, the counting core 223 becomes fully saturated. As a result, the winding 227 offers such a relatively low impedance that the transistor is no longer biased off. Accordingly, the remainder of the tenth pulse drives the transistor into conduction and enables reset energy to be applied to the winding 229 from a source +V.

As shown by "dot" notation, the windings 227 and 229 are regeneratively coupled such that the reset energy is applied via the winding 227 back to the base of the transistor 225 to hold the transistor into conduction until the counting core is fully reset. During the reset procedure, a diode 231 becomes forward biased and couples a positive output pulse to an UNGATED CARRY, a PRINT CARRY, and a GATED CARRY output. The latter conducts only when a CARRY ENABLE input is high so as to back bias a diode 233.

*Product accumulator address register*

As mentioned hereinbefore each stage 209 of the product accumulator 207 is individually addressable during the formation of partial products. Such addressing is accomplished by the product accumulator address register—AAR—235, shown logically in FIG. 15. The AAR also acts as an interface between the control center 45, in the accounting machine 41, and the PA 207 for purposes of effecting the preprogramming or preshift of the PA.

The AAR basically comprises four complementing flip flops, a SHUNT AND gate encoding network, and an AND gate decoding network. The four complementing flip flops are combined to form a binary counter and are labeled FF1, FF2, FF4, and FF8 according to their binary value. The diode encoder network, shown schematically in FIG. 16, provides means to preset the AAR to any one of a number of preselectable column shifts. The encoder also provides a signal which sets a multiply flip flop—MUL FF—237 and thereby enables the multiply operation. The diode decoder network, shown schematically in FIG. 17, gates high outputs from the complementing flip flops with GATED CLK output pulses. This results in the addressing or routing of the GATED CLK pulses to the preselected column in the product accumulator during multiplying.

The AAR is counted or advanced by the application of negative going or low signals into either a $\overline{JAM}$ or a 3 COUNT input. The $\overline{JAM}$ signal advances the counter by 1; whereas, the 3 COUNT signals, which were discussed in reference to the group pulse counter 169, advance the AAR by 3. A four stage binary counter potentially has 16 outputs and, in the configuration shown, will count from 0 to 15 and back to 0 automatically. An AC element 239 and an inverter 241 are coupled between the "0" side of FF8 and the "0" side of FF4 to thereby enable FF4 to be set whenever FF8 is set. This results in the AAR counting in the following sequence: 0, 1, 2, 3, 4, 5, 6, 7, 12, 13, 14, 15 and then back to 0. This counting sequence limits the number of AAR outputs to 12, one for each accumulator stage 209, while retaining the automatic count from 0 to 15 and back to 0.

The preshift encoder input signals are at ground potential and are supplied from the control center 45 as shown in FIG. 1. A ground signal applied at any one of the encoder inputs results in each of the flip flops being set or reset in a predetermined arrangement. Also, the MUL FF 237 is set due to ground being applied to its $\overline{MUL}$ or "0" output. For this reason, the encoder inputs are labeled SHIFT·MUL. For example, and with reference to FIG. 16, a ground signal applied at the SHIFT 0·MUL input is routed through the encoder SHUNT AND gates to the flip flop outputs labeled 1, 2, 4, 8, and $\overline{MUL}$. This results in the resetting of all of the AAR flip flops and the setting of the MUL FF. As shown in FIG. 17, the AND gates in the decoder gate these high outputs with the GATED CLK input to address column 12 of the product accumulator through decoder output D–12.

Assuming that all of the AAR flip flops are now reset, a switching of the $\overline{JAM}$ signal from an AND gate 243 which operates as a negative OR gate to set FF1. The decoded output then changes from D–12 to D–1, to thereupon address column 1 of the PA. The next low $\overline{JAM}$ signal resets FF1, causes the FF1 output to go low, and sets FF2. The decoded output is then D–2 or column 2. The next subsequent low $\overline{JAM}$ signal again sets FF1 without resetting FF2; accordingly, the decoded output becomes D–3, which addresses the third stage 209 of the PA 207.

The counting of the AAR continues in the above outlined manner until an output is generated from the decoder output line D–7. At this time, FF1, FF2, and FF4 are set and FF8 is reset. The next low $\overline{JAM}$ signal causes FF1, FF2 and FF4 to be reset and FF8 to be set. The setting of FF8 produces a low $\overline{8}$ output which triggers the AC element 239. The resulting high output pulse from the AC element elicits a low output from the inverter 241 through to the $\overline{FF4}$ output via an AND gate 245. FF4 is then set and enables the addressing of the eighth stage of the product accumulator via the D–8 decoder output. Counting of the AAR continues sequentially thereafter until there is an output from D–11 and then back to the output line D–12.

*Preshift concept*

Before combining all of the previously discussed elements and building blocks into the configuration illustrated in FIG. 1 and thereupon describing a basic multiplication operation, the concept and advantages of preshifting the product accumulator will be examined further. It has been established, for example, that the product accumulator 207 can transfer and the readin and printer sections 51 and 53 can process no more than a twelve digit product; however, the multiplying system is capable of generating and temporarily storing the twenty digits of a product developed from a ten digit multiplier and a ten digit multiplicand. Accordingly, means must be provided to discard those least significant digits of the product that lie beyond the twelfth position. Preferably, such means should not affect the values of the remaining twelve significant digits in the product.

In the computation of many business transactions, the multiplier and the multiplicand have digits to the right of the decimal point. As a result, the product has many digits in the decimal fraction, several of which are usually insignificant. For example, if a man worked for 20.75 hours at a job that paid $4.15 per hour, his salary could be computed as follows:

| | |
|---|---|
| Accumulator Columns | 6 5 4 3 2 1 |
| Multiplicand | 2 0 . 7 5 |
| Multiplier | $ 4 . 1 5 |
| 1st Partial Product | 1 0 3 7 5 |
| 2nd Partial Product | 2 0 7 5 |
| 3rd Partial Product | 8 3 0 0 |
| Final Product | $ 8 6 . 1 1 2 5 |

Obviously the digits 5 and 2, appearing in columns 1 and 2 of the product accumulator, are insignificant. Since the twelve stages of the product accumulator of the subject system are intercoupled such that they can be addressed as well as propagate tens carries in a ring-like manner, the PA can be preshifted rearwardly two columns so that, commencing with the least significant digit, the partial products and the final product will be entered into columns 11, 12, and 1 through 4 as follows:

| | |
|---|---|
| Accumulator Columns | 4 3 2 1 12 11 |
| 1st Partial Product | 1 0 3 7 5 |
| 2nd Partial Product | 2 0 7 5 |
| 3rd Partial Product | 8 3 0 0 |
| Sum of Partial Products | 8 6 1 1 2 5 |

A clearing of all columns addressed prior to column 1 discards the digits 5 and 2 stored in columns 11 and 12, leaving in columns 1 through 4 the final product $86.11.

Not only does a preshift mode of operation eliminate excessive digits and insignificant digits, but it allows for the use of a fixed decimal point location. Accordingly, if it were decided to obtain final products having only two digit decimal fractions, all partial product digits that would generate decimal fraction digits past the second or hundredth position would be preshifted into the high order accumulator columns and be cleared subsequent to their summation and propagation of tens carries.

By employing the preshift concept and having the same number of columns in the printer as stages in the product accumulator, each accumulator stage can be permanently linked to a particular printer column. Thus, progressive shifting during the multiply operation or justification of the final product in the accumulator is obviated. The following table correlates the value of the preprogrammed shift with the accumulator stage or column receiving the least significant digit of the first formed partial product:

| Preshift | 0 | 2 | 3 | 4 | 5 | 6 | 7 | 8 |
|---|---|---|---|---|---|---|---|---|
| PA Stage | 1 | 11 | 10 | 9 | 8 | 7 | 6 | 5 |

In the detailed discussion of the product accumulator 207 and the accumulator address register 235 there was described the manner by which a particular accumulator stage 209 is addressed in response to a unique preshift and multiply signal from the control center 45. Although it was stated that the AAR decoder outputs D–1 through D–12 address PA columns 1–12, it would be more accurate to state that the particular output lines enable the entry of the least significant digit of the next to be formed partial product in that selected column or stage of the PA. In fact, in the preshift step of the multiply operation the AAR decoder output lines address the next preceding column of the PA. Then, in the start multiply step, the PA is counted or advanced one column position by the setting of a flip flop 246, entitled the jam flip flop —JAM FF—249, which is intercoupled as shown in FIG. 1. When set, the JAM FF generates the previously described $\overline{\text{JAM}}$ signal which goes low and advances the AAR by one position.

*Operation*

A typical operation of the subject multiplication system will be described with particular reference to FIGS. 1 and 18–31 in conjunction with the example problem shown in FIG. 21 in which $94.76 is multiplied by 3.12.

It will become apparent that the multiply operation is very analogous to the step by step multiplication procedure taught in grammar school. One notable difference is that, rather than multiplying two digits such as 6×2 (the least significant of the multiplicand and the multiplier) to obtain the product 12, the value of the multiplicand digit is added to itself a number of times equal to the value of the multiplier digit; i.e., 6+6=12. For computer usage, addition is far simpler than multiplication and, although it may appear slower by comparison to a one step multiply procedure, the high speed electronic computing components in the multiplying adjunct can solve a lengthy problem in a matter of milliseconds.

*Preshift, initial restore, and start multiply*

Prior to triggering the multiplying adjunct 43 into operation, the multiplier readout section 47 is indexed with the factor 3.12 and the multiplicand readout section 49 is indexed with the factor $94.56. Since this is a decimal monetary computation, it is normal that the product contain a two digit decimal fraction. Accordingly, two of the four digits in the decimal fraction of the resulting product must be eliminated. This is accomplished by a preprogrammed shift of two which is preset into the control center 45.

The first step of the multiply operation is the transmission of the previously described SHIFT 2·MUL signal from the control center 45. This signal preshifts the AAR two columns, tentatively selects the tenth accumulator stage, and sets the MUL FF 237. The next step is the initiation of an INITIAL RESTORE signal and a start multiply sequence. As shown in FIGS. 1 and 18, the control center 45 applies an INITIAL RESTORE "IR" signal to the MPAR 137 and the MCAR 139 to reset them both to 0 (see FIG. 9). Thus enabled, they address the first, i.e., the least significant digit column in their respective readout section. The INITIAL RESTORE signal also resets the CLK FF 173 and a count accumulator flip flop —CA FF—251. Additionally, the IR signal is coupled with the MUL signal from the just previously set MUL FF to set the JAM FF 249 and also to restore to 0 all of the stages 209 in the PA 207.

For purposes of illustration, the IR output line and many other of the yet to be described input and output lines are shown as carried within a common cable 253. Whenever more than one signal is employed to achieve a specific result, the flow chart, such as FIG. 18, will show the additional signals in a rectangle at the side of the resultant condition. Although not specifically pointed out hereinafter, AC and other delay elements, gates, and inverters are employed in a manner obvious to those skilled in the art to attain proper timing relationships, signal levels, and isolation.

The setting of the JAM FF produces a high signal at its "1" or JAM output "J," which is coupled to the 0 input of the GPC 169 (see FIG. 12) which sets the GPC to 0. The "0" output of the JAM FF emits a low $\overline{\text{JAM}}$ signal "J" which, as previously explained, advances the AAR 235 by one position to thereby enable the eleventh accumulator stage to receive the least significant partial product digit formed by the least multiplication of the least significant digit of the multiplicand and multiplier—6 and 2.

The JAM signal is next applied to the MPAR and MCAR and enables them to respectively address the first column in the readout sections 47 and 49 by applying thereto a unique column select ground signal via the conductors 141. Addressed in this manner, the readout section 49 enters the multiplicand digit 6 into the encoder of the MCC 159 (see FIG. 10) via the conductor 161 and sets its FF1 and FF4 and resets its FF2, FF9, and FF0. The readout section 47 enters the value of 2 into the encoder of the MPC 157 and thus conditions its counter to temporarily store the value of 8, which is the tens complement of 2, by setting its FF1, FF2, and FF4 and resetting its FF9 and FF0.

Assuming that as yet there have been no system failures, the MCC and MPC will each produce a LOADED output signal "L" which together gate and generate a reset signal for the JAM FF. Once the JAM FF is reset, the MPC and MCC are no longer being jammed with the output from their respective readout sections. The MPC and MCC continue to temporarily store the jammed digit, but are now enabled to be advanced from that digit value position by pulses into their COUNT input.

*Multiply*

The resetting of the JAM FF 249 instigates a signal which is gated with the MPC=$\overline{0}$ and MCC=$\overline{0}$ outputs and is applied to set the CLK FF 173, as noted on the continuing flow chart, FIG. 19, and the logic diagram, FIG. 1. The ensuing output from the "0" side of the CLK FF is a $\overline{\text{CLK FF}}$ signal which is applied to the CARRY ENABLE input of all the product accumulator stages 209 (see FIGS. 13 and 14). With the carries thus enabled, the single tens carry to be produced by the multiplication of 6×2 is transferrable from the now addressed eleventh stage to the twelfth stage.

The $\overline{\text{CLK FF}}$ signal is also coupled to the CLOCK 167 and turns on the UNGATED CLK pulses (see FIG. 11).

The UNGATED CLK pulses are transmitted to the GPC and the MCC such that the trailing edge of each pulse sequentially counts the GPC from its initially set position of 0 and also advances the MCC from its loaded position of 6. After four pulses are emitted from the UNGATED CLK output, the GPC is in a 4 position and the MCC attains the 0 position. The 0 count output from the MCC and the high output from the CLK FF are gated and applied to set the CA FF 251.

The "1" output of the now set CA FF is coupled to the CLOCK to enable its GATED CLK output. Since a preshift of two was programmed and the AAR was subsequently advanced one position, its D–11 output is activated and the GATED CLK pulses are routed to the eleventh stage of the product accumulator. The addressed accumulator stage is counted upon the leading edge of each GATED CLK pulse. During this time the UNGATED CLK pulses continue to count the GPC and MCC.

When the GPC is advanced to 9, the output from its FF D is applied to the COUNT input of the MPC to advance it by one so its count equals 9 (see FIGS. 12 and 10). The next UNGATED CLK pulse advances the GPC to 0 and produces a GPC=0 AC signal which resets the CA FF and thereby disables the GATED CLK output. The CLOCK continues to emit pulses from its UNGATED CLK output.

At this juncture, ten UNGATED CLK pulses have been generated, six GATED CLK pulses have been added into the eleventh stage or column of the product accumulator, the GPC has been counted from 0 to 9 and back to 0, the MCC has been counted from 6 to 0 and back to 6, and the MPC has been advanced from 8 to 9. Although the GATED CLK pulses are now disabled, the UNGATED CLK pulses continue being applied to the MCC and GPC until again MCC=0. Thereupon the CA FF is again set and the GATED CLK output directs another train of six pulses into the eleventh column of the product accumulator.

When the GPC next counts to 9 and then 0, several logic conditions are satisfied. Upon GPC=9, the MPC is advanced from 9 to 0 and produces an MPC=0 output signal. As soon as GPC=0 and the GPC=0 AC is transmitted, the CA FF is reset and its output disables the GATED CLK output. Also, the MPC=0 signal is gated with the GPC=0 AC signal and causes the CLK FF to reset and turn off the CLOCK; i.e., the UNGATED CLK pulses.

By the above described operation two groups of six pulses are entered into the preselected eleventh column of the product accumulator. During the addition of the tenth pulse, a carry is transmitted to the twelfth accumulator column, such that the value 12 is stored in those two columns or stages 209 of the product accumulator 207.

*0 factor*

As hereinbefore described, the CLOCK is enabled by the setting of the CLK FF when it receives the $$MPC=\bar{0} \cdot MCC=\bar{0}$$

signals as well as the reset output from the JAM FF. Whenever either or both of the factor counters 157 and 159 store a 0 there is no need to enable the CLOCK and go through the multiply rountine outline in FIG. 19, since the partial product digit must be a 0. However, it is necessary to again set the JAM FF and thereby set GPC=0, advance the AAR by 1 and also advance the MCAR by 1 so that the start operation for the next multiply routine can be initiated, as discussed with reference to the right side of the flow chart FIG. 18.

The flow chart FIG. 20 and a portion of the logic diagram FIG. 22 illustrate the shortcut taken when MCC=0 or MPC=0. When either of these signals are gated with the inversion of the address register first and last digit outputs from the MCAR (see FIG. 9) and a signal elicited from the resetting of the JAM FF, they produce an output from an end of digit gating circuit —EOD—255. The EOD output is gated with the MUL signal from the MUL FF and causes the JAM FF to be set and thereby produce the MCAR+1, and the GPC=0 signals.

*Clear accumulator stage*

It was previously explained that when a certain number of columns are preshifted, the preshifted columns are used simply to generate carries and must be cleared of insignificant digits for possible future use to accumulate higher order significant digits and also to prevent the printing of improper digits in those columns even if they are not reemployed. Therefore, in the present example, the amounts accumulated in the eleventh and twelfth columns of the product accumulator must be cleared. FIGS. 22 and 23 set forth the logic elements and the logic flow required for the accumulator clearing operation. To accomplish this clearing, a flip flop 257 known appropriately as the clear flip flop—CLR FF—is employed. Control over the setting of this bistable element comes from a group of gates, not shown, which feed into and out from a least significant digit flip flop—LSD FF—259. Once the clear operation is completed, the JAM FF 249 is again set and the second multiplicand digit 7 is multiplied by the first multiplier digit 2.

As above described, the CLK FF 173 is reset and the CLOCK 167 is turned off as soon as the product of the first digit in the multiplicand and the first digit in the multiplier is formed, since these are non-zero factors. The "1" side of the CLK FF goes low and produces a $\overline{\text{CLK FF}}$ signal which is gated with the LSD FF output signal and the ARFD output from the MCAR to set the CLR FF 257. The output from the CLR FF is applied to both inputs of the CLOCK in a manner which enables the propagation of both the GATED CLK and the UNGATED CLK pulses (see FIG. 11).

Pulses from the GATED CLK output are added to the eleventh stage of the product accumulator until it produces an UNGATED CARRY output in response to the receipt of the 10th pulse and automatically resets itself to 0. The UNGATED CARRY signal generates a pulse which resets the CLR FF, turns off the CLOCK, and thus leaves the eleventh stage in the 0 count or clear condition. During this operation the CARRY ENABLE input is activated; accordingly, the 1 stored in the twelfth stage remains undisturbed. The resetting of the CLR FF provides a signal which is coupled through the EOD gating circuit 255, the output of which is gated with a MUL signal and is applied to the JAM FF 249 to set it. Setting of the JAM FF once again sets the GPC to 0 and advances the AAR by 1, as previously discussed and illustrated in FIGS. 18 and 20. The setting of the JAM FF now also advances the MCAR 139 by one position so that it addresses the second column of the readout section 49 and thereby enables the loading of the MCC 159 with the next least significant digit 7. The output obtained upon the resetting of the CLR FF 255 is also sent back to the reset input of the LSD FF 259 via an AC element—CLR AC—261, and would reset it is the AAR=0 signal were present; however, at this time the AAR=11, as it is still addressing the eleventh stage of the PA 207.

Briefly recapitulating the system operation completed thus far, two groups of six pulses have been added into the eleventh stage and one carry has propagated into the twelfth stage of the product accumulator. During the clear operation, sufficient pulses were added into the eleventh stage to empty or reset it to 0 without altering the 1 stored in the twelfth stage. The JAM FF is again set and in turn sets the GPC to 0 and counts the AAR and the MCAR such that the second digit of the multiplicand is available for multiplication by the first digit of the multiplier.

Thereafter, the multiply operation described with reference to FIG. 19 is repeated for the multiplicand digit 7 and the multiplier digit 2 and 14 GATED CLK pulses are added into the twelfth accumulator stage, which had stored a 1 from the previous tens carry of 6×2. As a result, a value of 5 is stored in the twelfth stage and a tens carry is transferred into the first stage of the accumulator, as its GATED CARRY input is coupled back to the GATED CARRY output of the twelfth stage of the PA. The multiplicand factor digit 7 is not the least significant digit; therefore, the ARFD signal is not available to enable the clear operation. Since neither factors are zero, the above discussed shortcut to set the JAM FF is not enabled. However, the $\overline{\text{CLK FF}}$ signal, and other signals are available to produce an EOD output which is gated with MUL to again set the JAM FF, which thereby advances the AAR for the third time, the MCAR for the second time, and also again sets GPC=0.

The latter procedure enables the formation of the product of 4×2. A repetition thereof forms the product of 9×2. Thereafter, the remaining six digits in the MCC are all 0; hence, the set JAM FF shortcut is enabled six successive times. As a result, the first complete partial product of 0000018952 is stored respectively in accumulator stages 8, 7, 6, 5, 4, 3, 2, 1, 12 and 11 as shown in the presentation of the example problem in FIG. 21.

*Realignment*

Again with reference to the physical presentation of the example problem in FIG. 21 the most significant digit 0 of the first partial product is aligned with the eighth accumulator stage; whereas, the least significant digit 6 of the second partial product must become aligned with the twelfth accumulator stage. Accordingly, in addition to the normal single count or one step advance of the AAR that arises when the JAM FF is set at the start of each multiply operation, the AAR must be advanced three more steps from AAR=8 to AAR=11 so that upon the next application of the JAM signal it will be counted to AAR=0; i.e. from addressing the eighth accumulator stage to the eleventh stage and then to be aligned with the twelfth stage. To enable the three steps or counts of the AAR, the previously discussed 3 COUNT output from the GPC 169 is produced (see FIG. 12). The entire realignment operation is shown logically in FIG. 24 with the aid of the flow chart, FIG. 25.

At the end of the formation of the first partial product, the CLK FF 173 is reset, as described with reference to the logic flow in FIG. 19, or remains reset in the event a factor of 0 is being processed, as in the instant example the logic flow of which is set forth in FIG. 20. The output from the CLK FF generates a signal which is gated with the ARLD output from the MCAR and is employed to set a realignment flip flop—ALIGN FF—263. The setting of the ALIGN FF produces from its "0" side an $\overline{\text{ALIGN}}$ signal which is coupled to the CLOCK 167 to thereby turn on the UNGATED CLK pulses and commence the counting of the GPC 169 from its 0 position. The output from the "1" side of the ALIGN FF is gated with the three pulses emanating from the AC element 197, as hereinbefore detailed with reference to FIG. 12, and couples these pulses to the 3 COUNT input of the AAR 235 (see FIG. 15) to advance the AAR from AAR=8 to AAR=11.

When the GPC advances to 8, the GPC $\overline{C}$ output goes high and is coupled back to the ALIGN FF 263 to reset it and thereby turn off the CLOCK. The GPC $\overline{C}$ signal is also employed for actuating the EOD gate 255 and therethrough for setting for the eleventh time the JAM FF 249. The resulting $\overline{\text{JAM}}$ output is coupled to the AAR to count it to AAR=0 and thus address the twelfth stage of the PA. The $\overline{\text{JAM}}$ signal is further employed to advance the MCAR from 9 back to 0 so that it again addresses the first or least significant digit position in the readout section 49. By being advanced back to 0, the MCAR produces an AR CARRY signal which is applied to the COUNT input of the MPAR 137 to step it from 0 to 1 so that it addresses the next least significant multiplier digit 1 via the readout section 47.

The first multiplicand digit is then multiplied by the second multiplier digit, in accordance with the logic operations outlined in the flow charts, FIGS. 18 and 19, and the GATED CLK pulses are added into the twelfth column of the product accumulator. When the CLK FF 173 is reset after this multiplication has taken place, the resulting $\overline{\text{CLK FF}}$ signal is gated with the ARFD and LSD signals and they set the CLR FF 257 and, in the manner described hereinbefore with reference to FIGS. 22 and 23, the twelfth stage is cleared after it transfers a tens carry into the first stage of the PA.

As hereinbefore explained, at the end of the clear operation the CLR FF is reset and initiates the CLR AC signal through a gate now having AAR=0. The resultant signal causes the LSD FF 259 to be reset and thereby prevents a future setting of the CLR FF and hence any more clear accumulator operations. If there were programmed a shift of five or seven instead of two, the LSD FF would not be reset until after the fifth or seventh clear operation respectively, because until that time the AAR=0 signal would not be present.

The second multiplicand digit 7 is then multiplied by the second multiplier digit 1 and thereafter the multiply sequence repeats itself continuously until the JAM FF has been set and reset a total of one hundred times. After each of the ten multiply operations upon the 10th multiplicand digit, the 3 count operation realigns the AAR such that the partial products are added into the twelve stages of the PA in the order shown in FIG. 21. When the ALIGN FF sets for the tenth time, the ALIGN signal gates with the ARLD signals from the MPAR and MCAR and resets the MUL FF 237. As shown in FIG. 1, the resetting of the MUL FF transmits an end of multiplication—EOM—signal back to the control center 45. Thus signaled, the control center is enabled to initiate the product readin and print operations.

*Exceed capacity*

As mentioned early in the description of this multiplication system, if the preprogrammed accumulator shift does not allow for large enough products to accommodate the size of the multiplicand and multiplier, or if the sum of the digits in the multiplier and multiplicand exceeds 20, digits will be generated into the product accumulator stages which already had been cleared and now contain correct values. This exceeding of capacity obviously will result in the computation of incorrect partial and final products. To prevent the undetected formation of incorrect products, the system produces an exceed capacity condition which blocks the control center 45 from initiating the product readin and print operations even if the MUL FF is reset and transmits the EOM signal.

To illustrate an exceed capacity situation in detail, assume that two ten digit factors are multiplied together with a preprogrammed shift of two. The table in FIG. 26 shows when a partial product can exceed the capacity of the system if there is a preshift of two. This condition can arise during the sixth through tenth multiplier operation from the twelfth accumulator column and also upon a carry out from the twelfth column into the first column during the fifth multiplier digit operation. The shaded area in FIG. 26 denotes the forbidden zone wherein the product could propagate in excess of the capacity of the product accumulator. If any digit value other than 0 is produced in the forbidden zone and is allowed to be added with the digits in the unshaded area, incorrect products will ensue. The size of the forbidden zone changes in response to changes in the amount of preshift; accordingly, a flexible logic format is required to cope with each situation. The following logic sequence is described with reference to the table of FIG. 26, the logic diagram of FIG. 27, and the flow chart of FIG. 28.

Employing a preshift of two, fourteen stages of the product accumulator are available, since the 11th and 12th stages are preshifted and cleared for future reuse after their first complete use. Accordingly, after the ninth multiplicand digit is multiplied by the sixth multiplier digit an exceed capacity flip flop—EC FF—265 is set regardless of the values of these two factor digits. The EC FF is set through a gate network having AAR=0, $\overline{\text{LSD}}$, $\overline{\text{ARFD}}$, $\overline{\text{ARLD}}$, and EOD AC 1 all high. It will be recalled that the LSD FF was reset at the end of the clearing of the twelfth stage and has remained in that condition. The address register first and last digit "not" signals will be available from the MCAR, since it is in the ninth position.

Although not hereinbefore stated or illustrated, the output from the EOD gating circuit 255 is coupled into two series connected AC elements. The first AC element, EOD AC 1, has its output gated, as shown in FIG. 27, to aid in the setting of the EC FF; whereas, the second AC element, EOD AC 2, has its output coupled to the set input of the JAM FF 249. In FIGS. 22 and 24 these logic elements are not shown and the EOD output is shown directly coupled to the JAM FF. Since AC elements provide a delay, the setting of the EC FF by use of EOD AC 1 and other signals occurs prior to the setting of the JAM FF via EOD AC 2 and therefore before the AAR is advanced from AAR=0 to AAR=1; hence, the AAR=0 signal remains available.

Once set, the EC FF produces from its "0" side a low output which is coupled to the control center 45 and, for the duration of this signal, prevents the initiation of the product readin and print operations. Assuming that an exceed capacity condition does not arise, the EC FF will remain set for the period of time that the sixth through tenth multiplier digits are coacting with the multiplicand digits shown in the shaded forbidden zone in FIG. 26. At the end of this time, for each multiplier digit, the tenth multiplicand digit is being addressed. Immediately thereafter the AAR is realigned and the ALIGN and $\overline{\text{LSD}}$ signals are gated to reset the EC FF.

For an exceed capacity condition to in fact exist, GATED CLK pulses must be applied to the PA at the same time the EC FF is set. As shown in FIG. 27, the GATED CLK and EC FF outputs are gated into the LSD FF 259 and set it to provide a return output to hold the EC FF set. Once set in this manner the EC FF cannot be reset by the combination of the $\overline{\text{LSD}}$ and ALIGN signals; hence, the control center remains blocked until the operator notices the condition, corrects it, and thereby enables the resetting of the LSD FF.

The second condition which triggers the exceed capacity condition is an attempt to propagate a tens carry from the twelfth stage into the first stage of the product accumulator at a time subsequent to the first addressing of the first stage. In the example of a preshift of two, this condition can arise when the tenth multiplicand digit is being multiplied by the fifth multiplier digit. At that time, the gating of $\overline{\text{LSD}}$, MUL, CLK FF, and PRINT from the twelfth column of the PA cause the setting of the EC FF, as illustrated in FIGS. 27 and 28. Thereupon, the application of the GATED CLK signal causes the setting of the LSD FF and, as above described, the blocking of the readin and print operations via the control center 45.

*Readin and print*

Once a final product is correctly produced and stored in the product accumulator, it is transferred into the readin unit 51 for print out by the printer 53 via an array of readin drivers 267, one of which is shown schematically in FIG. 29. The logic diagram, FIG. 30, and the flow chart, FIG. 31, illustrate this readin and print operation. Upon receipt of the EOM signal from the MUL FF 237, the control center 45, if not blocked by an exceed capacity condition, emits a signal to a print flip flop—PRT FF— 269 to set it. The resultant $\overline{\text{PRINT}}$ signal triggers a PRINT AC element—PRT AC—271 which generates a COUNT PRINT signal that is applied to the COUNT input of the PA 207 and advances each of its stages by 1. If the product stored in the accumulator were 000000029565, as in the example problem illustrated in FIG. 21, then after the COUNT PRINT signal is transmitted, the stored value would become 111111130676. It is to be noted that gated carries from each stage 209 are not enabled throughout the readin and print operation. The output from the PRT AC 271 is also coupled to the "1" input of the GPC 169 to set it to 1 so that it counts therefrom when it receives UNGATED CLK pulses.

As next to be explained, the control center 45 now enables the propagation of a group of nine readin pulses RP0 through RP8. Each RP pulses enables a burst of nine GATED CLK pulses to be applied to all of the accumulator stages and thereby effectively backsteps each stage one digit for each burst. A PRINT CARRY output from one or more accumulator stages, when coincident with a GPC=$\overline{9}\cdot\overline{0}$ signal, triggers the readin driver 267 respectively coupled to that stage or stages and thereby loads the associated column or columns in the readin section 51 with the digit represented by the initiating RP signal, which is in fact the digit value stored in the particular accumulator stage.

These RP signals are coupled to a pair of series connected AC elements 273 and 275. The resultant output from the AC element 273 is gated with the PRINT signal from the PRT FF to set the GPC to 1. This mode of setting the GPC to 1 is used just prior to the transmission of each of the RP1 through RP8 pulses. For convenience of illustration, many of the signal lines in FIG. 30 are shown carried in a cable 277. When the AC element 273 times out, it triggers the AC element 275. The output from the AC element 275 gates with the PRINT and RP signals to set the CLK FF 173 and thereby starts the generation from the CLOCK 167 of a train of UNGATED CLK pulses which are counted into the GPC and the PA. The latter is accomplished through a gate which receives a high PRINT signal and thereby produces, for receipt by each counter stage, the COUNT PRINT input signal.

The GPC counts from 1 through 9 and then to 0 and generates the GPC=0 AC pulse which resets the CLK FF and turns off the CLOCK. In this manner the RP0 signal enables nine pulses to be added into and a PRINT CARRY signal to be produced from each product accumulator stage. The number in the product accumulator thereby again becomes 000000029565. The PRINT CARRY output from each accumulator stage is applied to the input of a discrete readin driver 267 but, as described hereinafter, the readin driver becomes actuated only when a $\overline{\text{READIN ENABLE}}$ signal—$\overline{\text{RIE}}$—is also applied. The $\overline{\text{READIN ENABLE}}$ signal is generated by the gating of the PRINT signal with GPC=$\overline{9}\cdot\overline{0}$ when the GPC counts to 9 and then 0 (see FIG. 12).

In the given example, the readin drivers for columns 6 through 12 are actuated at this time, because their associated accumulator stages produce a PRINT CARRY signal when GPC=9. The output from these seven readin drivers causes the loading of their respective columns 6 through 12 in the readin section 51 so that they are each set to 0. Accordingly, the RP0 pulse has set to 0 each readin column, the counterpart of which in the product accumulator, also stores a 0.

*Readin driver*

The operation of the printer 53 in conjunction with the control center 45 and the readin section 51 is adequately set forth in the previously cited patents to Butler and Bradshaw et al., respectively 2,629,549 and 2,822,752.

As shown in FIG. 2 of the Bradshaw patent, there is an assembly of printer column-select solenoids numbered I–XII, one for each of the twelve columns in the printer.

For accurate operation of the present multiplying system, these column-select or readin solenoids must be dropped out rapidly. Accordingly, there is provided the readin driver circuit 267 which couples the PRINT CARRY output from each stage 209 of the product accumulator 207 to its respective readin solenoid 283, as shown schematically in FIG. 29.

Each readin driver circuit is enabled by an inverted high output derived from a low READIN ENABLE input and then is triggered by a PRINT CARRY output signal from the counter stage in the corresponding column of the product accumulator when it produces a tens carry. This driver circuit generates as an output a negative voltage spike which acts to reverse the current in the associated readin solenoid 283 and induces the release of its clapper at a unique digit represented time.

A silicon controlled rectifier 285 is employed in this circuit because of its ability to switch heavy current in a very short period of time. Once this SCR is in a high conduction state, it continues to conduct after the trigger signal on its gate input leg 287 has been removed. Prior to receiving a trigger signal, the following static conditions exist. The READIN ENABLE input is high and biases a transistor 289 into conduction to thereby clamp the gate leg 287 low and prevent the SCR from conducting. The cathode of the SCR is at a slightly positive voltage due to current flowing from ground through a group of series coupled diodes 291 and a resistor 293 to a +V source, which normally may be +12 v. The anode of the SCR and the left plate of a capacitor 295 are supplied a much higher potential, such as +100 v., from a source +P. The readin solenoid is held energized and the right plate of the capacitor is at an intermediate voltage, approximately +30 v., due to current flowing from ground through the readin solenoid and a resistor 297 to the +P source. When the transistor 289 is conducting, a positive PRINT CARRY signal from the product accumulator is dropped over a resistor 299, a diode 301, which forms a SHUNT AND gate, and the transistor to ground.

During a print operation, the READIN ENABLE input goes low and causes the output at the collector of the transistor 289 to be high. This removes the ground clamp from the SCR gate leg 287 for the duration of this enabling signal. A PRINT CARRY signal occurring during this time causes the gate leg to go positive and triggers the SCR into conduction. This results in a low resistance discharge path to ground for the +100 v. on the left plate of the capacitor. The 100 v. negative change on the left plate of the capacitor induces its right plate to go from approximately +30 V. to approximately −70 v. This negative voltage acts to reverse the current flowing through the readin solenoid, rapidly deenergizes the solenoid, and forces the release of its clapper.

Even after the trigger signal has terminated, the SCR 285 continues to conduct and provides an ample discharge time for the right plate of the capacitor 295. This produces a negative potential for a sufficient length of time to insure the release of the readin solenoid clapper. When the left plate of the capacitor is discharged, the current flowing through the SCR is reduced to a low level determined by a resistor 303. This low current holds the gate leg at a positive potential slightly above the SCR turn on level. Accordingly, the SCR continues to conduct at this reduced level until the READIN ENABLE signal goes high and induces the clamping of the SCR gate leg to ground and the resultant turning off of the SCR.

Subsequent to the RP0 pulse and after the loading of the readin columns which are set to 0, the RP1 pulse is transmitted. As above described with reference to the RP0 signal, the RP signals enable the setting of the CLK FF, and the resetting of the GPC to 1. Thereupon, another group of nine pulses are added to each column of the product accumulator. At this juncture, none of the twelve readin drivers 267 are actuated, since no PRINT CARRY outputs occur at the same time that GPC=9. This is true since the final product did not contain a 1 in any column position. The PA now holds the amount 999999918454.

The RP2 pulse next initiates the transmission of another nine pulses into all stages of the PA to change the stored amount to 888888807343, causes the actuation of the fifth column driver, and thereby sets a 2 into the fifth column of the readin section 51. The RP3 through RP8 pulses sequentially change the value stored in the PA by groups of nine until a total of 82 pulses are set into every accumulator stage; i.e., an initial COUNT PRINT pulse plus nine bursts of nine pulses each. During this time the readin drivers for columns 1, 2, and 3 are actuated and respectively set into those columns of the readin section the values of 5, 6 and 5. Subsequent to the RP8 pulse, all of the readin columns not previously set become set automatically into the 9 position; accordingly, the fourth column is set to 9.

In the above described manner the twelve columns of the readin section 51 are set with the final product 000000029565. Thereupon, the control center 45 enables the printer 53 so that it may reproduce the digit values set into the readin section. The printer also provides the pre-established decimal point and dollar sign and prints out the final product of $0000000295.65.

As above explained, each accumulator stage 209 has received eighty-two COUNT PRINT pulses and therefore the product accumulator now stores the value of 222222241787; i.e., two units too high in each stage. Since it may be desired to utilize subsequently the values stored in the product accumulator for other forms of data transmission and for checking the accurray of the previously described printout, each stage should be advanced by 8 more pulses. This operation is initiated by a signal from the control center 45 which gates with the PRINT signal to set the ALIGN FF 263 and, in a manner similar to the realignment operation discussed with reference to FIGS. 24 and 25, the GPC and the PA stages are counted by 8 pulses until a GPC E·C̄ signal resets the ALIGN FF and turns off the CLOCK 167.

From the foregoing it will be seen that an efficient and logically direct multiplying system has been provided for accomplishing all of the objects and advantages of this invention. While the fundamental novel features of this multiplying system have been shown and described with reference to a particular style of accounting machine, specific logic blocks, and subsystems, it will be apparent to those skilled in the art that variations may be made therein without departing from the spirit of the invention.

What is claimed is:

1. In a multiplying system having means for receiving and storing multidigit factors and means for recording the product thereof, said system comprising:
  a pair of factor address registers for sequentially addressing each factor digit of said receiving and storing means,
  a pair of factor counters for sequentially receiving and temporarily storing each addressed factor digit,
  a group pulse counter,
  a pulse generator for propagating pulses to the group pulse counter and to one of the factor counters,
  a multistage product accumulator, each stage of which is adapted to store one digit of a multidigit product and being selectively coupleable to the pulse generator for receiving some of the pulses generated thereby,
  said accumulator stages each having automatic emptying and carry pulse transmitting means actuated upon the attainment of a pulse storage capacity,
  said accumulator stages being serially coupled in a ring-like manner for the transmitting of carry pulses to the next stage in the ring,
  a preshiftable and incrementally advanceable product accumulator address register coupled to the product accumulator for addressing at any one time only one of the accumulator stages for receiving pulses from the pulse generator, control means coupled to the product accumulator address register for determining the amount of preshifting and for executing the preshifting of the initial setting of the product accumulator address register and thereby determining which of the accumulator stages is first addressed, logic circuitry coupling the other of said factor counters to the pulse generator and to the group pulse counter and also coupling the group pulse counter back to the pulse generator for controlling the number of pulses generated thereby without interruption and for enabling the propagation of the same number of groups of uninterrupted pulses from the pulse generator as the value of the factor digit temporarily stored in said other factor counter, logic gating coupling said one factor counter to said pulse generator for enabling the transmission to an addressed accumulator stage of a series of pulses from one of the uninterrupted groups of pulses, said series of pulses being equal in sum to the value of the factor digit temporarily stored in said one factor counter, and a first switching circuit coupled to the product accumulator address register and to the factor address register coupled to said one factor counter for producing a signal to advance by one position the address registers coupled thereto to thereby enable another factor digit to be temporarily stored in said one factor counter and to address the next accumulator stage upon the completion of the transmission from the pulse generator to an addressed accumulator stage of a number of pulses equal to the product of the one factor digit temporarily stored in each of the factor counters, said first switching circuit also coupled to said logic circuitry for enabling the pulse generator to transmit to the group pulse generator to transmit to the group pulse counter and the next addressed accumulator stage, said pair of factor address registers being intercoupled for advancing by one position the factor address register coupled to said other factor counter to thereby enable said other factor counter to temporarily store another factor digit after multiplication of the last factor digit temporarily stored in said one factor counter.

2. The combination according to claim 1 further comprising:

a clear accumulator stage circuit coupled to the pulse generator for successively emptying each accumulator stage, preshifted via the product accumulator address register, after such stage has stored the pulses resulting from the product of a multiplication involving the first factor digit temporarily stored in said one factor counter.

3. The combination according to claim 2 wherein said clear accumulator stage circuit comprises:

a second switching circuit coupled to the pulse generator, the enabling of said second switching circuit applying a signal to the pulse generator for initiating the transmission of a plurality of pulses to the accumulator stage to be emptied, said accumulator stage, upon attaining its pulse capacity, automatically emptying and transmitting its carry pulse back to said second switching circuit for disabling it and thereby discontinuing the transmission of pulses from the pulse generator, and means for preventing the developed carry pulse from being transmitted to the next stage in the accumulator ring.

4. The combination according to claim 1 further comprising:

a product accumulator address register realignment circuit coupled to that address register for advancing it by a sufficient number of additional positions to enable the accumulator stage one position advanced from the stage that last received product forming pulses resulting from the addressing of the first digit temporarily stored by said one factor counter to receive the pulses forming the product of the first digit temporarily stored by said one factor counter and a digit temporarily stored by said other factor counter prior to the addressing of the next factor digit for temporary storage by said other factor counter.

5. The combination according to claim 4 wherein said product accumulator address register realignment circuit comprises:

a third switching circuit coupled to the pulse generator and to the product accumulator address register for enabling the pulse generator to transmit a group of pulses to the group pulse counter and for enabling the group pulse counter to transfer to the product accumulator address register said sufficient number of additional pulses, said group pulse counter being coupled back to said third switching circuit for disabling that circuit after the transfer of said additional pulses.

6. The combination according to claim 1 further comprising:

an exceed capacity circuit coupled to the control means for providing an inhibit signal thereto to prevent the enabling of the product recording means when the sum of the factor digits would be incompatible with the amount of the preshifting of the product accumulator address register and thereby would enable the transmission of pulses into an accumulator stage that already stored a final digit of the product of multiplication.

7. The combination according to claim 6 wherein the exceed capacity circuit comprises:

a fourth switching circuit coupled between the pulse generator and the control means, the fourth switching circuit being enableable by a pulse from said series of pulses transmitted from the pulse generator to the product accumulator and generating in response thereto a signal for inhibiting the control means from enabling the product recording means.

8. In a multiplying system having means for storing two multidigit factors of multiplication and for producing a plurality of multidigit partial products of multiplication, each partial product containing the product formed by the multiplication of all of the digits in one of said factors commencing with its least significant digit by one of the digits in the other of said factors:

a multistage product accumulator having a total number of stages substantially less than the maximum total number of digits in both of said factors, said accumulator stages each enableable for cumulatively storing one partial product digit from each of a plurality of partial products, said accumulator stages arrayed from the least significant to the most significant position, a presettable and incrementally advanceable product accumulator address register coupled to the product accumulator having the same number of enableable positions as the number of accumulator stages for addressing at any one time only one of said accumulator stages, the positions of the product accumulator address register being serially enableable in a ring-like manner for addressing in a like manner the accumulator stages, and a control means coupled to the product accumulator address register for variably presetting the first enableable position therein for addressing that position's associated accumulator stage independent of its position of significance, the positional difference between the accumulator stage first addressed and the least significant accumulator stage representing a preshifted quantity of stages, the maximum sum of the preshifted stages and the total actual number of accumulator stages equaling the maximum total number of digits in both of said factors.

9. In a multiplying system according to claim 8:

a clear accumulator stage circuit coupled to the product accumulator for clearing from each preshifted stage the cumulation of partial product digits after that stage has stored the digit of the partial product formed by the least significant digit of said one factor, and an exceed capacity circuit coupled to the control means for inhibiting the operation of the multiplying system in the event that the number of factor digits exceeds the sum of the preshifted and actual accumulator stages.

10. In a multiplying system according to claim 9:

a product accumulator address register realignment circuit coupled to that register for advancing that register more than one increment upon the completion of the formation of each of the partial products.

11. In a multiplying system according to claim 10, said realignment circuit comprising:

a switching circuit enabled upon the completion of each partial product, a pulse generator coupled to the switching circuit and enabled thereby, and a pulse counter coupled between the pulse generator and the product accumulator address register for transferring to that register a predetermined number of register advancing pulses, said pulse counter also being coupled to the switching circuit for disabling that circuit after the generation of said number of register advancing pulses.

12. In a multiplying system having means for storing two multidigit factors of multiplication, means for producing a plurality of multidigit partial products of multiplication, each partial product containing the product formed by the multiplication of all of the digits in one of said factors commencing with its least significant digit by one of the digits in the other of said factors and means for recording the final product of multiplication:

a multistage product accumulator for cumulatively storing each partial product and the resulting final product of the multiplications, a pulse generator coupled to each of the accumulator stages, a pulse counter coupled to the pulse generator for controlling the transmission to the accumulator stages of a plurality of bursts of pulses for generating carry pulses, and a readin driver coupled to each of the accumulator stages and to the pulse counter, said driver transferring to the recording means the digit of the final product stored in its associated accumulator stage upon the coincidence of a carry pulse, a signal from the pulse counter and the last pulse in any of the bursts of pulses.

References Cited

UNITED STATES PATENTS 3,161,764   12/1964   Croy _____ 235—60

OTHER REFERENCES

IBM 1401 Reference Manual, page 29, 1960.

IBM Technical Disclosure Bulletin, vol. 6, No. 10, March 1964, Automatic Decimal Alignment, P. E. Goldsberry and W. I. Lockett.

MALCOLM A. MORRISON, *Primary Examiner.*

V. SIBER, *Assistant Examiner.*